United States Patent
Lee et al.

(10) Patent No.: US 10,757,276 B2
(45) Date of Patent: Aug. 25, 2020

(54) OPERATION PANEL AND OPERATION DEVICE

(71) Applicant: FUJI XEROX CO., LTD., Tokyo (JP)

(72) Inventors: Bokryong Lee, Kanagawa (JP); Kei Otagiri, Kanagawa (JP); Takuya Ishikawa, Kanagawa (JP); Toshihisa Naka, Kanagawa (JP); Naoya Koide, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/291,518

(22) Filed: Mar. 4, 2019

(65) Prior Publication Data
US 2020/0068078 A1 Feb. 27, 2020

(30) Foreign Application Priority Data

Aug. 22, 2018 (JP) .................. 2018-155472
Aug. 22, 2018 (JP) .................. 2018-155473
Aug. 22, 2018 (JP) .................. 2018-155474

(51) Int. Cl.
  *H04N 1/00* (2006.01)
  *G06F 3/041* (2006.01)
(52) U.S. Cl.
  CPC ....... *H04N 1/00411* (2013.01); *G06F 3/0412* (2013.01); *G06F 3/0414* (2013.01); *G06F 3/0416* (2013.01); *H04N 1/00496* (2013.01)
(58) Field of Classification Search
  CPC .......... H04N 1/00411; H04N 1/00496; G06F 3/0416; G06F 3/0414; G06F 3/0412
  USPC ............................................... 358/1.15
  See application file for complete search history.

(56) References Cited

U.S. PATENT DOCUMENTS

| | | | |
|---|---|---|---|
| 2014/0253949 A1* | 9/2014 | Tsujimoto | H04N 1/0084 358/1.14 |
| 2015/0242026 A1 | 8/2015 | Nakamura et al. | |
| 2016/0170638 A1* | 6/2016 | Funakawa | H04W 4/80 715/773 |
| 2016/0191730 A1* | 6/2016 | Ohata | H04N 1/00411 358/1.15 |
| 2017/0017184 A1* | 1/2017 | Yamada | G03G 15/5016 |
| 2017/0289371 A1 | 10/2017 | Namba | |

FOREIGN PATENT DOCUMENTS

| | | |
|---|---|---|
| JP | 2010-114784 A | 5/2010 |
| JP | 2011-114784 A | 6/2011 |
| JP | 2014-112353 A | 6/2014 |
| JP | 2015-065696 A | 4/2015 |
| JP | 2016-139287 A | 8/2016 |
| JP | 2016-167819 A | 9/2016 |
| JP | 2017-139813 A | 8/2017 |
| JP | 2017-184199 A | 10/2017 |

* cited by examiner

*Primary Examiner* — Allen H Nguyen
(74) *Attorney, Agent, or Firm* — Oliff PLC

(57) ABSTRACT

An operation panel includes: a housing; a reading unit configured to read information from a medium allowed to approach a predetermined position of the housing; a first operation unit provided outside a predetermined range including the position in a front surface of the housing and configured to receive an operation; and a second operation unit provided within the range, configured to receive an operation, and configured to receive the operation less easily than the first operation unit.

23 Claims, 23 Drawing Sheets

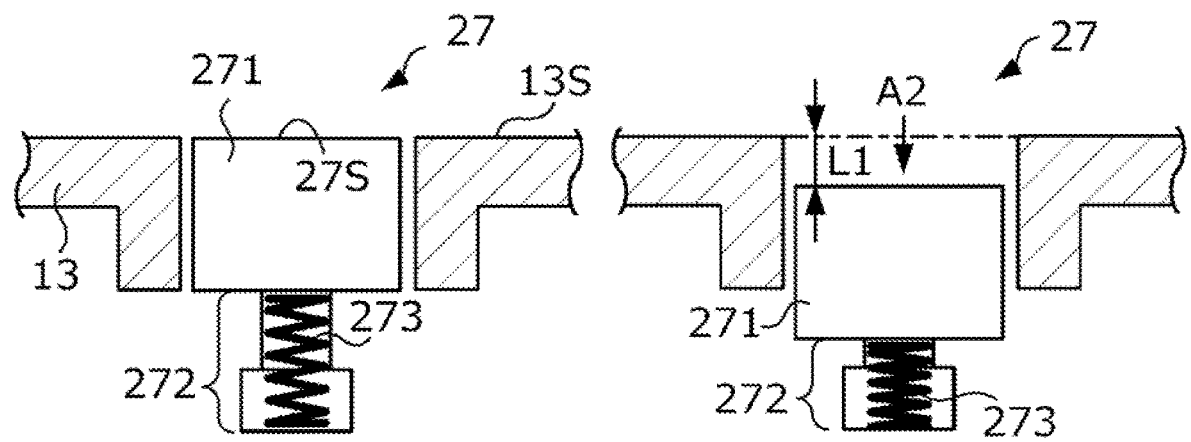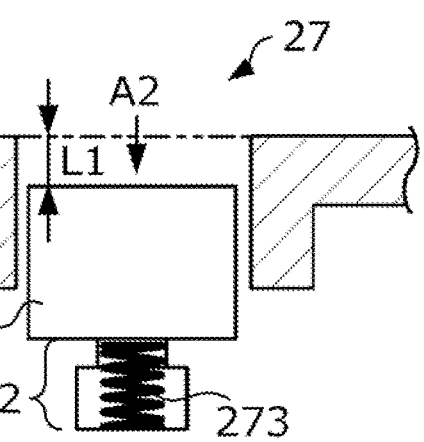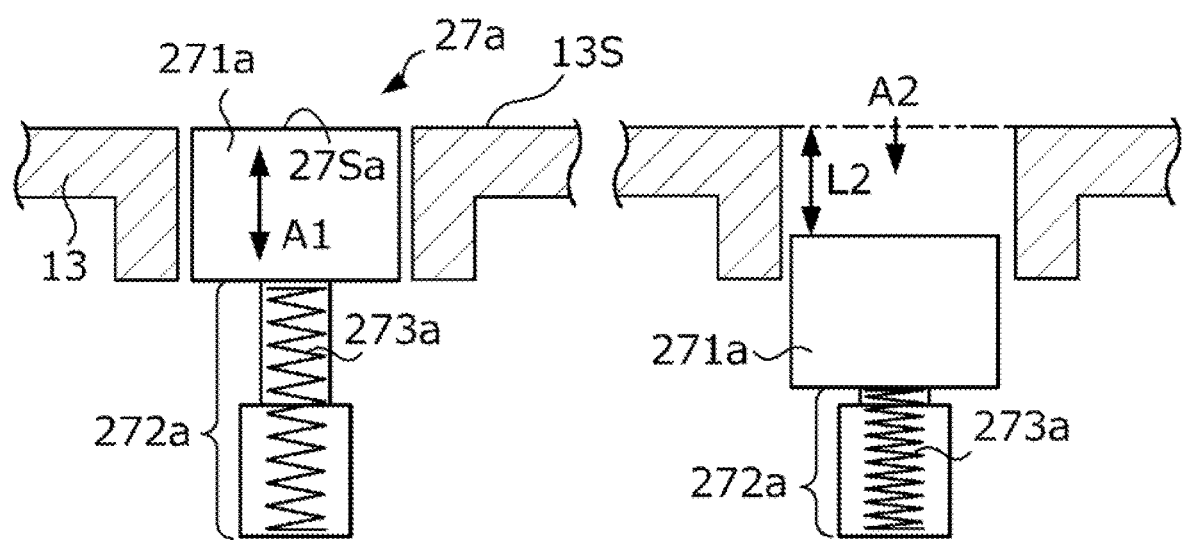

FIG. 20
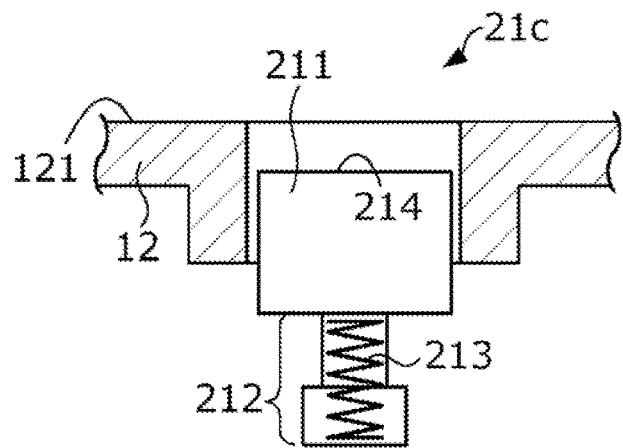
FIG. 21A
FIG. 21B
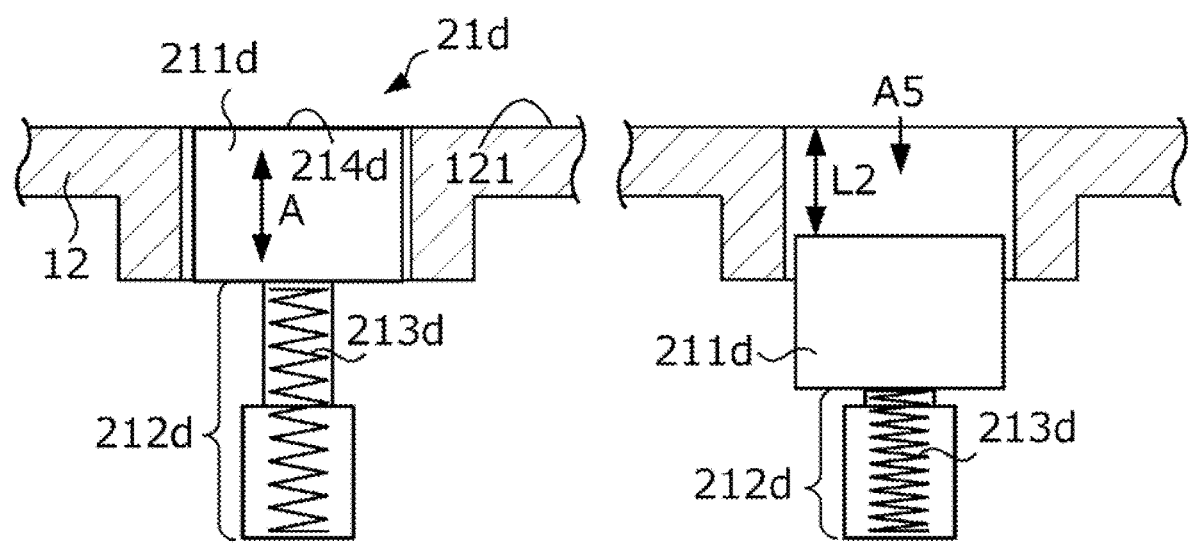

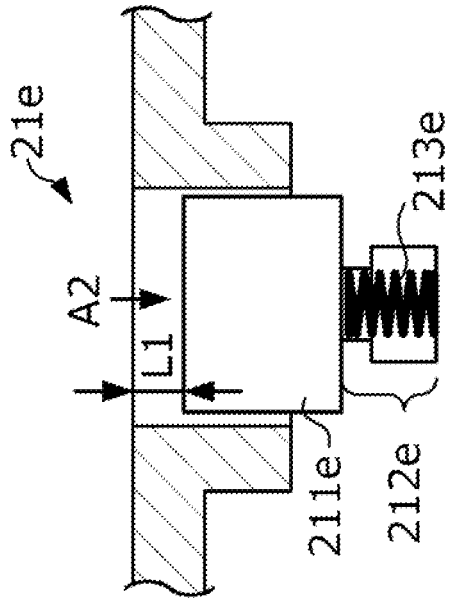
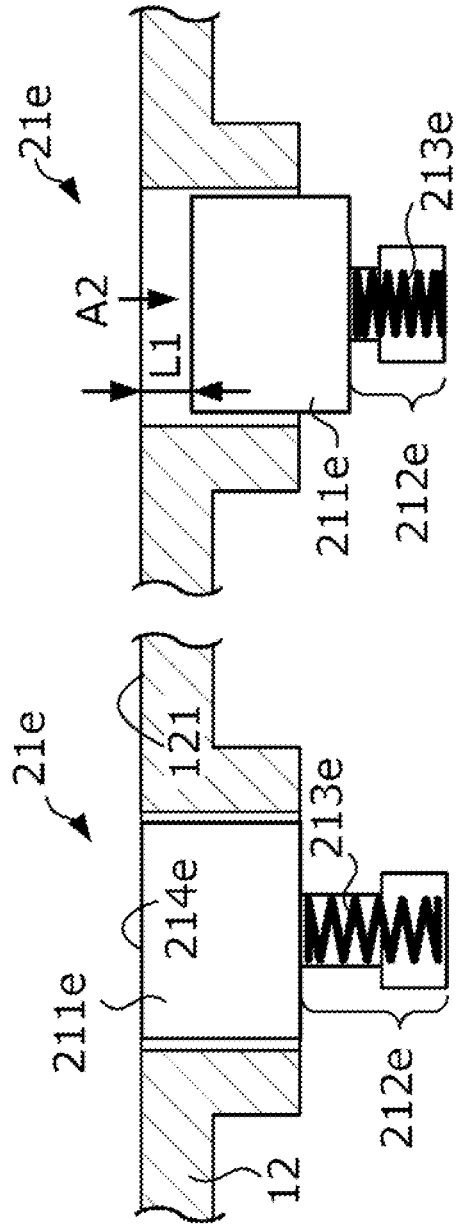

OPERATION PANEL AND OPERATION DEVICE

CROSS-REFERENCE TO RELATED APPLICATIONS

This application is based on and claims priority under 35 USC 119 from Japanese Patent Application No. 2018-155472 filed Aug. 22, 2018, Japanese Patent Application No. 2018-155473 filed Aug. 22, 2018, and Japanese Patent Application No. 2018-155474 filed Aug. 22, 2018.

BACKGROUND

(i) Technical Field

The present disclosure relates to an operation panel and an operation device.

(ii) Related Art

Regarding a technique of an operation panel, JP 2010-114784 A describes a technique of placing a non-contact IC card on a reading panel without unintentionally touching an operation key or the like by setting the level of an upper surface position of the reading panel to be higher than the level of an upper surface position of an operation surface (operation key or the like) of an operation display panel.

Regarding the technique of the operation panel, JP 2017-139813 A describes a technique of making the role of a key easier to understand by disposing first and second touch operation regions, in which capacitive keys are arranged, in an adjacent manner and providing a third touch operation region including a mechanical key as a separate region.

Regarding the technique of the operation panel, JP-A-2015-65696 describes a technique of preventing an erroneous operation by disposing a mechanical key away from a capacitive key.

In the technique of JP-A-2010-114784, information is read by bring a medium, from which information can be read, close to the operation panel. For example, information is read through a short range wireless communication by bringing a smartphone, an IC card, or the like close to the operation panel, or information is read by using a code reader by bringing a smartphone displaying a QR code (registered trademark) close to the code reader. When such reading is performed by the operation panel, since the medium is brought close to the operation panel, the medium may come into contact with the operation unit, and thus a user's unintentional operation (that is, an erroneous operation) may be received.

In a touch panel, an operation (flick, swipe, or the like) of moving an indicator such as a finger while the indicator is in contact with the touch panel is performed. When this operation is performed at the end of the touch panel, the user may touch a portion outside the touch panel with the indicator, and an operation may unintentionally be performed (that is, an erroneous operation) by operating an operation unit (a portion that receives an operation, such as a button) provided outside the touch panel.

A rotatable operation panel for adjusting an angle to be easily seen by a user is known. In such an operation panel, when the user holds an end of the operation panel and rotates the operation panel, the hand holding the end may push a button to perform an erroneous operation. In addition, even in an operation panel detachable from a device main body or an operation panel originally independent from the device main body, when the user grasps the operation panel for a purpose other than an operation, an erroneous operation may be performed by the gripping hand.

SUMMARY

Aspects of non-limiting embodiments of the present disclosure relate to preventing an erroneous operation in an operation panel that reads information when a medium is placed close to the operation panel.

Aspects of non-limiting embodiments of the present disclosure also relate to preventing an erroneous operation of an operation unit around a touch panel.

Aspects of the non-limiting embodiments of the present disclosure further relate to preventing an erroneous operation when the operation panel is gripped.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to one aspect of the present disclosure, there is provided an operation panel including: a housing; a reading unit configured to read information from a medium allowed to approach a predetermined position of the housing; a first operation unit provided outside a predetermined range including the position in a front surface of the housing and configured to receive an operation; and a second operation unit provided within the range, configured to receive an operation, and configured to receive the operation less easily than the first operation unit.

BRIEF DESCRIPTION OF THE DRAWINGS

Exemplary embodiments of the present invention will be described in detail based on the following figures, wherein:

FIGS. 7A and 7B are diagrams illustrating a seventh button;

FIGS. 8A and 8B are diagrams illustrating a cross section of a seventh button of a modification example;

FIG. 20 is a diagram illustrating a cross section of a first button of a modification example;

FIGS. 21A and 21B are diagrams illustrating a cross section of a first button of a modification example;

FIGS. 22A and 22B are diagrams illustrating a cross section of a first button of a modification example;

DETAILED DESCRIPTION

First Exemplary Embodiment

Figure 1:
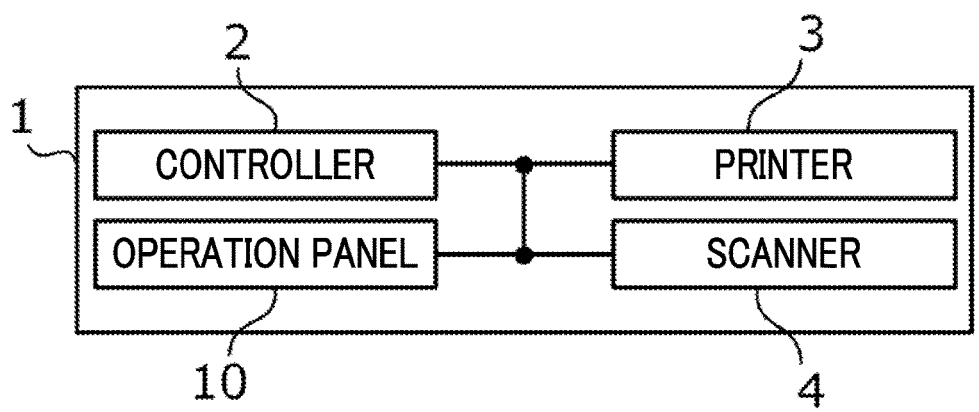
FIG. 1 is a diagram illustrating a hardware configuration of an image processing apparatus according to a first exemplary embodiment.

FIG. 1 illustrates a hardware configuration of an image processing apparatus 1 according to the first exemplary embodiment. The image processing apparatus 1 is an apparatus for performing image processing relating to an image read from a document, an image to be printed on a recording medium such as a sheet, and the like. The image processing apparatus 1 includes a controller 2, a printer 3, a scanner 4, and an operation panel 10.

The controller 2 performs processing such as exchange of image data used for image processing with an external device, processing of image data, and the like. The controller 2 controls operations of the printer 3 and the scanner 4 to perform a scanning process, a printing process, a copy process, and the like. The printer 3 is, for example, an image forming unit that accumulates toners of plural colors, and forms a color image by transferring one or more toners to a medium such as a sheet by an electrophotographic system. The printer 3 forms an image represented by the image data supplied from the controller 2 on a medium.

The scanner 4 is an image reading unit that includes a light source, an image sensor, and the like, and optically reads an image indicated on the front surface of a sheet-like document placed on a document glass. The scanner 4 supplies image data indicating the read image to the controller 2. The operation panel 10 is a receiving unit that receives an operation from a user who uses a host device (the image processing apparatus 1). When the operation panel 10 receives the user's operation, the operation panel 10 supplies operation data representing the received operation, to the controller 2.

The controller 2 performs the above-described processing based on the operation represented by the supplied operation data, and the printer 3 and the scanner 4 controlled by the controller 2 operate. As described above, the controller 2, the printer 3, and the scanner 4 are main bodies of the image processing apparatus 1 of which operations are instructed by the operation on the operation panel 10. The image processing apparatus 1 is an example of the "operation device" of the present disclosure, and the controller 2, the printer 3, and the scanner 4 are examples of the "main unit" according to the present disclosure.

Figure 2:
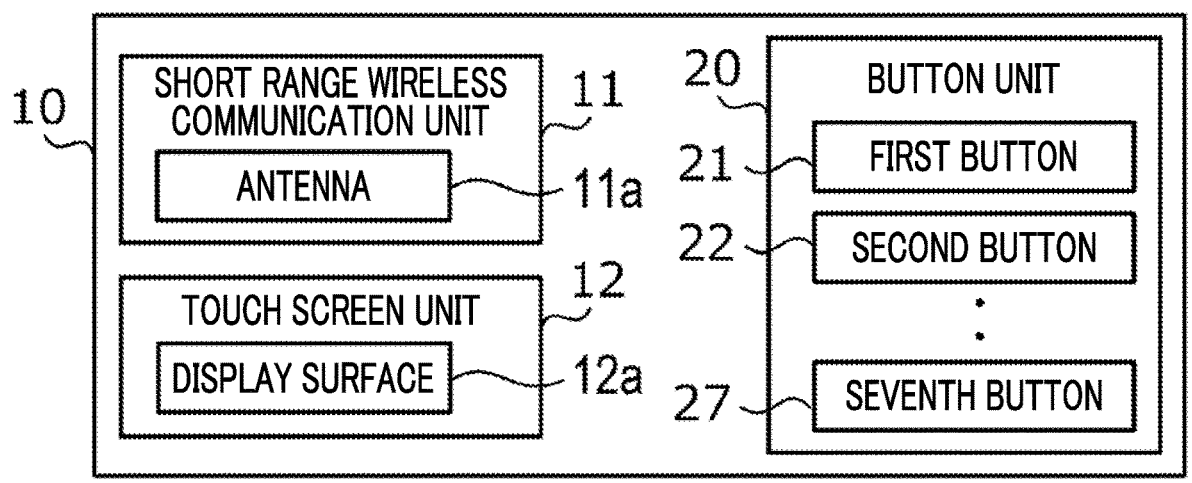
FIG. 2 is a diagram illustrating a detailed configuration of an operation panel.

FIG. 2 illustrates a detailed configuration of the operation panel 10. The operation panel 10 includes a short range wireless communication unit 11, a touch screen unit 12, and a button unit 20. The short range wireless communication unit 11 is a communication unit that performs wireless communication with an external device at a short distance. The wireless communication performed by the short range wireless communication unit 11 conforms, for example, a near-field communication (NFC) standard. The short range wireless communication unit 11 includes an antenna 11a, and performs wireless communication with a communication partner apparatus when the communication partner apparatus comes close to the short range wireless communication unit 11 by a short distance of about several cm by being held in the vicinity of the antenna 11a.

The touch screen unit 12 includes a display having a display surface 12a and a touch panel, and the touch screen unit 12 displays an image on the display surface 12a and receives a user's operation on a displayed operator image. The button unit 20 is a part in which plural buttons, which are switches operated by being pressed by a user, are disposed. In the first exemplary embodiment, the button unit 20 includes seven buttons from a first button 21 to a seventh button 27. Each button is assigned an operation such as turning on/off of a power source and starting a copy process.

Figure 3:
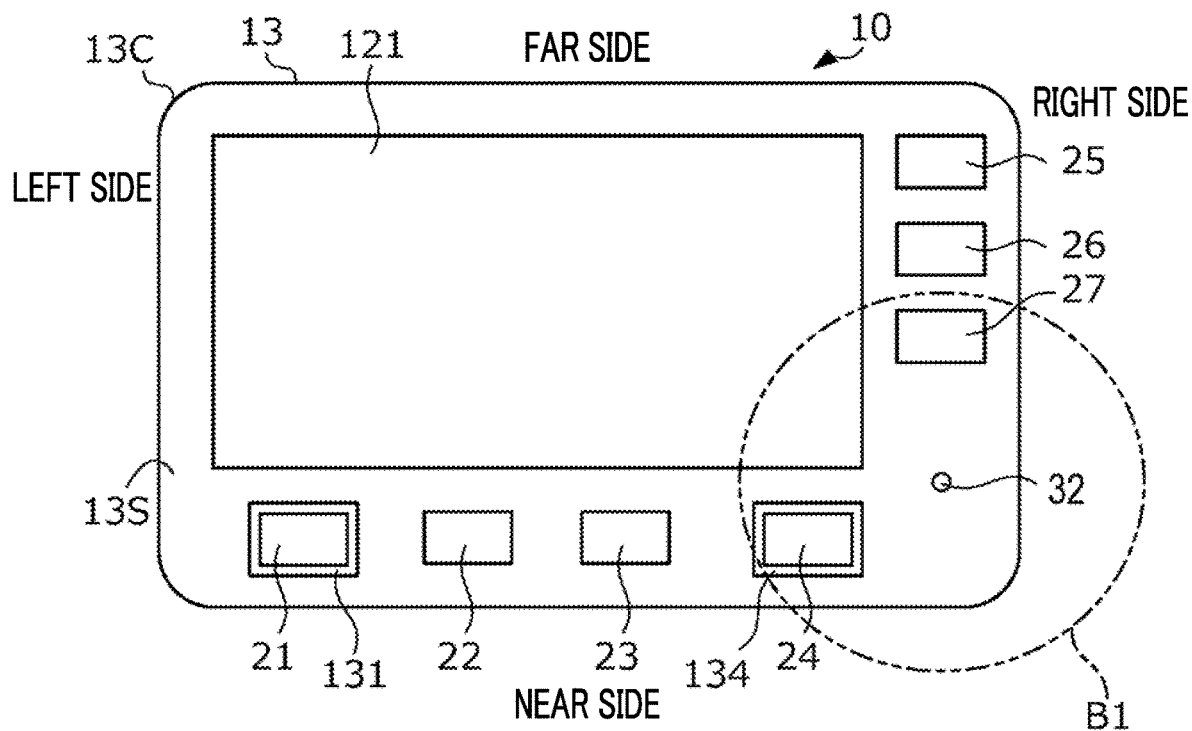
FIG. 3 is a diagram illustrating an external appearance of the operation panel.

FIG. 3 illustrates an external appearance of the operation panel 10. The operation panel 10 includes a housing 13. The housing 13 is a rectangular box-shaped member, and stores each unit illustrated in FIG. 2. The housing 13 is an example of the "housing" of the present disclosure. The housing 13 has a front surface 13S, and the display surface 12a of the touch screen unit 12 is provided on the front surface 13S. In the operation panel 10 (the housing 13), a portion on a near side and a portion on a far side for the user are defined, and the operation panel 10 (the housing 13) is operated by the user standing on the near side.

The display surface 12a is disposed close to a left corner 13C of the front surface 13S on the far side as viewed from the user. The first button 21, the second button 22, the third button 23, and the fourth button 24 are disposed side by side on the near side of the display surface 12a from the left side, and the fifth button 25, the sixth button 26, and the seventh button 27 are disposed side by side on the right side of the display surface 12a from the far side.

A mark 32 representing a position of the antenna 11a of the short range wireless communication unit 11 is displayed on the right side of the fourth button 24 and on the near side of the seventh button 27. When a communication device such as a smart phone or an integrated circuit card (IC card) having a function of NFC communication is held over (brought close to) the mark 32, the short range wireless communication unit 11 and the communication device perform NFC communication. In the NFC communication, for example, information used for user authentication (a user ID or the like) is exchanged.

In this manner, the short range wireless communication unit 11 functions as a reading unit that reads information from a communication device that is brought close to the mark 32 provided at a predetermined position of the housing 13. The short range wireless communication unit 11 is an example of the "reading unit" of the present disclosure. The short range wireless communication unit 11 performs short range wireless communication with the communication device and reads information stored in the communication device. The communication device (smartphone, IC card, or the like) referred to herein is an intermediate device for reading information, and is an example of the "medium" of the present disclosure. Next, details of the structure of each button will be described with reference to FIGS. 4A and 4B and subsequent figures.

Figures 4A, 4B:
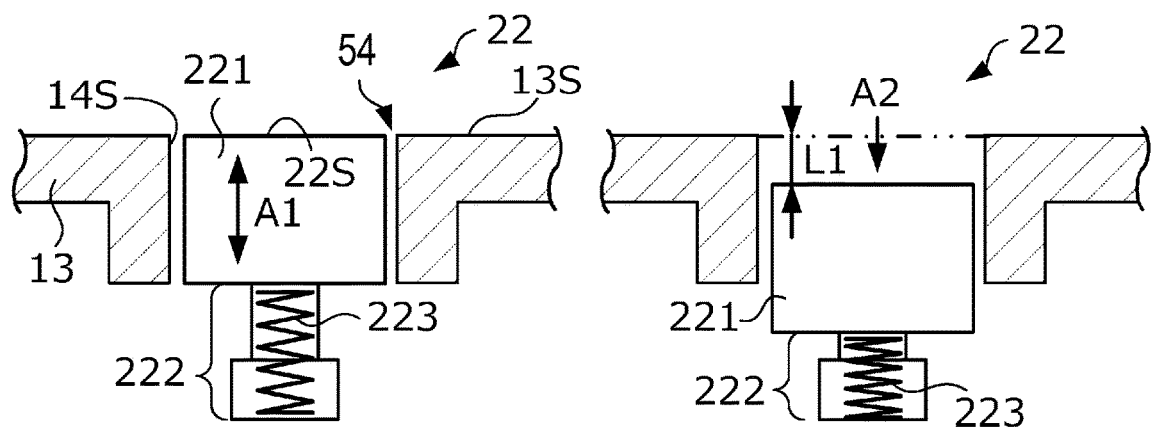
FIGS. 4A and 4B are diagrams illustrating a second button.

FIGS. 4A and 4B illustrate a cross section of the second button 22. The second button 22 is a button having a standard configuration, and has the same configuration as the third button 23, the fifth button 25, and the sixth button 26. The second button 22 includes a contact portion 221, an expansion and contraction portion 222, and a spring 223. The contact portion 221 is, for example, a member having a square prism shape, and a finger of a user who operates the second button 22 contacts a square contact surface 22S.

The contact portion 221 is disposed in a square-prism-shaped hole 54 of the housing 13, and moves in a direction along an inner circumferential surface 14S of the hole 54 (in an axial direction A1 of the square-prism-shaped hole 54). An expansion and contraction portion 222 is fixed to a side of the contact portion 221 opposite to the contact surface 22S. The expansion and contraction portion 222 is a member extending and contracting in the axial direction A1 and is provided with the spring 223 therein. In the first exemplary embodiment, as illustrated in FIG. 4A, when no force is applied to the contact surface 22S, positions of the contact surface 22S and the front surface 13S of the housing 13 in the axial direction A1 are adjusted to be substantially the same (this positional relationship is an example, and the contact surface 22S may protrude or may be recessed. The same applies to the other buttons).

When the user performs an operation of pushing the contact surface 22S and moves the contact portion 221 in a pushing-in direction A2 by a pushing-in amount L1, the expansion and contraction portion 222 fixed to the contact portion 221 is contracted as illustrated in FIG. 4B. As a result, for example, an open and close state of a circuit (not illustrated) is switched, and an operation corresponding to the second button 22 (for example, an operation of starting a copy function) is performed in conjunction therewith. When the user releases the finger from the contact surface 22S, the spring 223 pushes back the contact portion 221 to return to the state illustrated in FIG. 4A.

Figure 5:
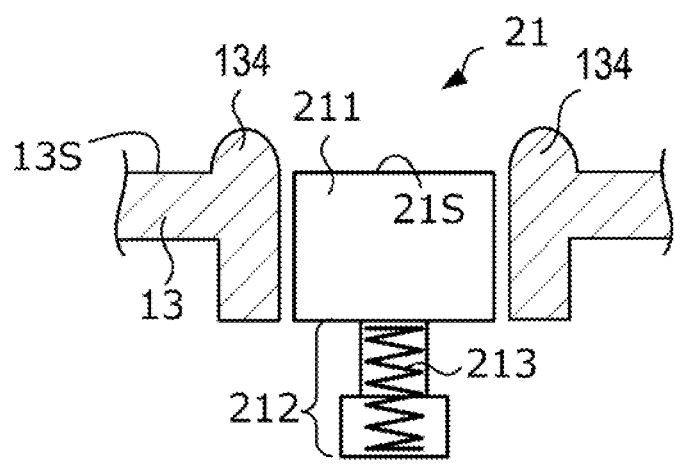
FIG. 5 is a diagram illustrating a first button.

FIG. 5 illustrates a cross section of the first button 21. Similar to the second button 22, the first button 21 includes a contact portion 211, an expansion and contraction portion 212, and a spring 213, and when no force is applied to a contact surface 21S, positions of the contact surface 21S and the front surface 13S of the housing 13 in the axial direction A1 are adjusted to be substantially the same. Unlike the second button 22, a rib 134 is provided around the contact surface 21S of the first button 21. The rib 134 is a portion in which the front surface 13S of the housing 13 protrudes more than other portions.

For example, when a finger is slid along the front surface 13S, the finger contacts the rib 134 before the contact surface 21S. Therefore, the user who does not intend to press the first button 21 notices that there is the first button 21, and stops the finger. An important operation (an operation having a large influence on other operations) such as turning on/off of a power source is assigned to the first button 21. By providing the rib 134 around the first button 21, it is possible to prevent an important operation from being performed by a user's unintentional operation.

A button that is provided outside a circular range centering on the mark 32 illustrated in FIG. 3 in the front surface 13S of the housing 13 and receives an operation is illustrated in FIGS. 4A to 5. This range is defined as a range in which it is considered that the above-described communication device may come into contact when the communication device is held over the mark 32. Hereinafter, this range is also referred to as a "contact range B1".

These buttons provided outside the contact range B1 are referred to as "first operation buttons". The contact range B1 is an example of the "defined range" of the present disclosure, and the first operation button is an example of the "first operation unit" of the present disclosure. Next, the fourth button 24 and the seventh button 27 as buttons that are provided within the contact range B1 and receive an operation will be described. Hereinafter, these buttons provided within the contact range B1 are referred to as "second operation buttons". The second operation button is an example of the "second operation unit" of the present disclosure.

Figure 6:
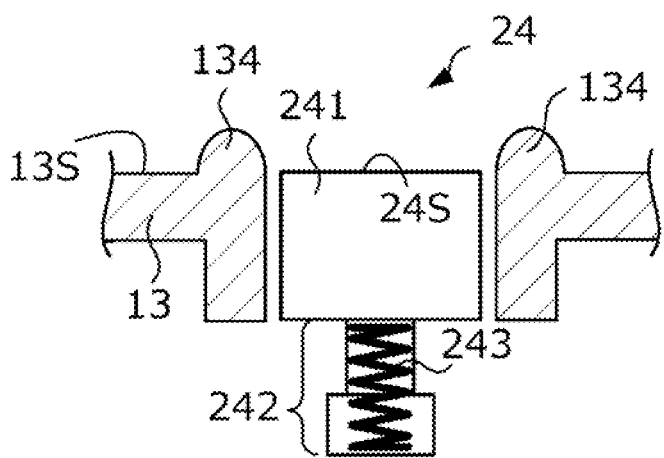
FIG. 6 is a diagram illustrating a fourth button.

FIG. 6 illustrates a cross section of the fourth button 24. Similar to the second button 22, the fourth button 24 includes a contact portion 241, an expansion and contraction portion 242, and a spring 243, and similar to the first button 21, a rib 134 (the level from the front surface 13S is common to the rib 134) is provided around a contact surface 24S. Similar to the first operation button described above, when no force is applied to the contact surface 24S of the contact portion 241, positions of the contact surface 24S and the front surface 13S of the housing 13 in the axial direction A1 are adjusted to be substantially the same.

FIGS. 7A and 7B illustrate a cross section of the seventh button 27. Similar to the second button 22, the seventh button 27 includes a contact portion 271, an expansion and contraction portion 272, and a spring 273 (a rib 134 is not provided around a contact surface 27S of the seventh button 27). As illustrated in FIG. 7A, in the seventh button 27, when no force is applied to the contact surface 27S of the contact portion 271, positions of the contact surface 27S and the front surface 13S of the housing 13 in the axial direction A1 are adjusted to be substantially the same. As illustrated in FIG. 7B, when the user pushes the contact surface 27S and moves the contact portion 271 in the pushing-in direction A2 by the pushing-in amount L1, an operation corresponding to the seventh button 27 is performed.

However, the spring 243 of the fourth button 24 and the spring 273 of the seventh button 27 have the same number of turns, the same coil diameter, and the same length in the axial direction A1 as those of the spring 223 illustrated in FIGS. 4A and 4B and the spring 213 illustrated in FIG. 5, but are thicker, and therefore have a large spring constant (that a larger force is required for deforming the spring). The first operation button and the second operation button are both moved by the user to receive the operation. Since both the first operation button and the second operation button are provided with the above-described spring, kinetic energy (pushing force) is required to move the first operation button and the second operation button until the operation is received.

Since the second operation button uses a spring having a larger spring constant than the spring constant of the spring of the first operation button, the repulsion force when the second operation button is moved is large, and the kinetic energy is large. This means that when the second operation button is operated, it feels heavier than when the first operation button is operated. In addition, when the operation is actually performed by applying the same force, the operation will be received less easily by the second operation button than by the first operation button.

When a user passes a communication device such as a smart phone over the mark 32 for authentication or the like, the corner of the communication device (often having a square plate shape) may come into contact with the button due to the approaching momentum. Then, the user does not intend to press the button, but the button may be pushed by the communication device. Such an erroneous operation may occur in a button disposed in the contact range B1 in which the communication device may come into contact when the communication device is held over the mark 32.

In the first exemplary embodiment, the second operation button disposed in the contact range B1 is configured to receive the operation less easily than the first operation button, and therefore, the second operation button is less likely to be pushed even when the corner of the communication device comes into contact with the second operation button. As a result, in the operation panel 10, that is, in the operation panel that reads information when the communication device becomes close thereto, erroneous operation is prevented as compared to a case where the easiness of the operation reception of the second operation button is not different from that of the first operation button (when the repulsion force of the springs of each operation button is uniform). Further, in the first exemplary embodiment, by making the easiness of the operation reception different, the erroneous operation is prevented without performing a special process.

Modification Example

The exemplary embodiment described above is only an exemplary embodiment of the present disclosure and may be modified as follows. The exemplary embodiment and each modification example may be implemented in combination as necessary.

Kinetic Energy Differentiation

In the exemplary embodiment, the kinetic energy is differentiated between the first operation button and the second operation button by varying the spring constant, but the method of differentiation is not limited to this.

FIGS. 8A and 8B illustrate a cross section of a seventh button 27a of the modification example. The seventh button 27a includes a contact portion 271a, an expansion and contraction portion 272a, and a spring 273a.

Also in the seventh button 27a, as illustrated in FIG. 8A, when no force is applied to the contact surface 27Sa of the contact portion 271, positions of the contact surface 27Sa and the front surface 13S of the housing 13 in the axial direction A1 are adjusted to be substantially the same. The lengths of the expansion and contraction portion 272a and the spring 273a in the axial direction A1 are longer than the lengths of the expansion and contraction portion 272 and the spring 273 of the exemplary embodiment. Therefore, as illustrated in FIG. 8B, when the user pushes the contact surface 27Sa and moves the contact portion 271a in the pushing-in direction A2 by a pushing-in amount L2 larger than the pushing-in amount L1, an operation corresponding to the seventh button 27a is performed.

On the other hand, the spring 273a has the same thickness, the same number of turns, and the same coil diameter as those of the spring 223 illustrated in FIGS. 4A and 4B and the spring 213 illustrated in FIG. 5, but has a longer length in the axial direction A1. Therefore, in the modification example, a movement amount (hereinafter referred to as "stroke") of the second operation button when the second operation button is moved is larger than that of the first operation button, and the kinetic energy for moving the second operation button until the operation is received is larger.

As a result, similar to the exemplary embodiment, the operation is received less easily by the second operation button is than by the first operation button, and an erroneous operation is less likely to occur than when the ease of the operation reception is not different between the second operation button and the first operation button. Further, as a result of increasing the stroke, for example, even when the corner of the communication device pushes the contact surface 27Sa, depending on the angle of the communication device, the side of the communication device comes into contact with the housing 13 before the contact surface 27Sa is moved by the pushing-in amount L2, and the contact surface 27Sa cannot be pushed any more.

In this manner, an erroneous operation is more prevented as compared with a case where the stroke is not different from that of the first operation button. On the other hand, when the stroke is not different from that of the first operation button as in the exemplary embodiment, the size of the second operation button in the axial direction A1 is reduced as compared with the case where the stroke is increased as in the modification example.

Contact Range

The contact range (the range in which it is considered that the communication device held over the mark 32 may come into contact) is not limited to the contact range B1 illustrated in FIG. 3.

Figure 9A:
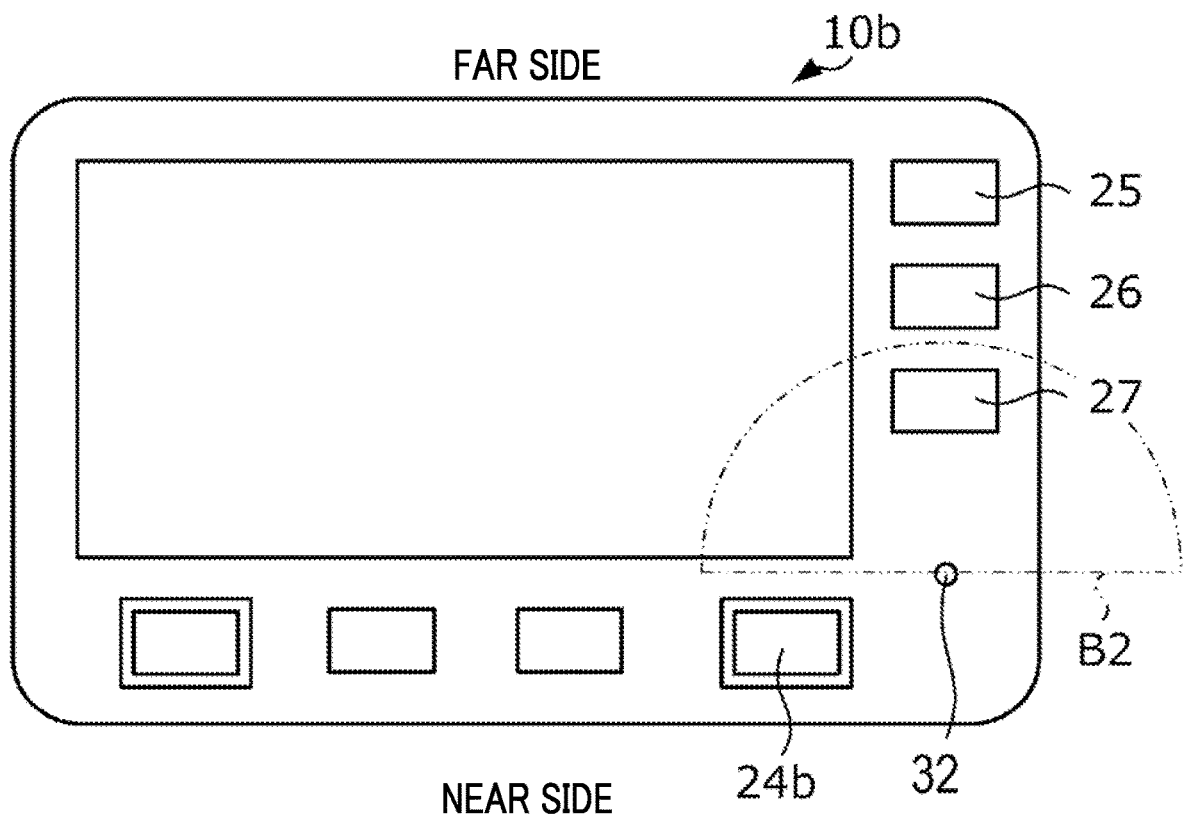
FIGS. 9A and 9B are diagrams illustrating an external appearance of an operation panel of a modification example.
Figure 9B:
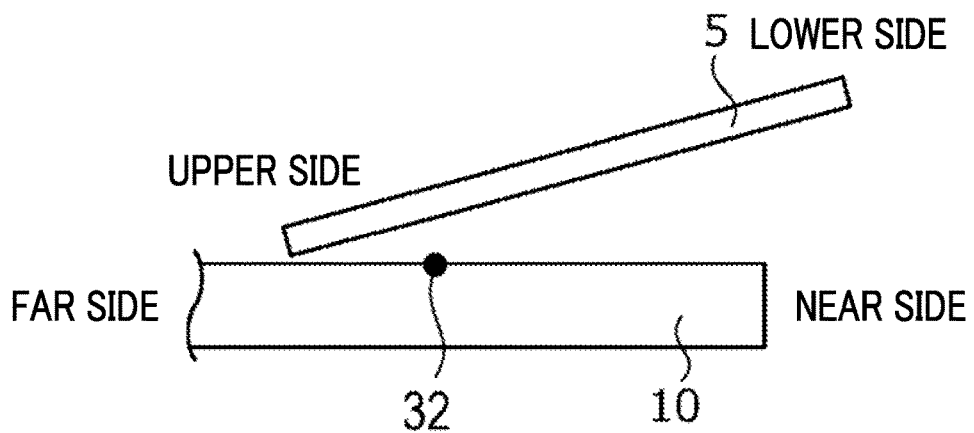

FIGS. 9A and 9B illustrate an external appearance of an operation panel 10b of the modification example. In the example of FIGS. 9A and 9B, a contact range B2 defined on the far side of the operation panel 10b relative to the mark 32 is illustrated.

More specifically, the contact range B2 is a range having a semicircular shape on the far side of the operation panel 10b relative to the mark 32, out of the circle having the mark 32 as the center. In a communication device such as a smart phone, an antenna for short range wireless communication is often disposed on an upper side of a display surface. When such a communication device is held in the hand, the upper side of the communication device 5 illustrated in FIG. 9B is likely to be inclined and held so as to be closer to the operation panel 10 than the lower side.

Therefore, even when the communication device 5 held over the operation panel 10b comes into contact with the operation panel 10b, since the contact position is likely to be closer to the far side than the mark 32, by using the button provided within the contact range B2 as the second operation button, an erroneous operation can be prevented similarly to the exemplary embodiment. By defining the contact range B2 smaller than the contact range B1, for example, the fourth button 24b is provided outside the contact range B2. Similarly to the first operation button described in the exemplary embodiment, it is easier for the fourth button 24b to receive an operation than it is for the second operation button.

As described above, according to the modification example, the number of the first operation buttons that can be easily pushed may be increased as compared with a case where the contact range is also defined on the near side of the operation panel as in the exemplary embodiment. The shape and the size of the contact range are not limited to those described above. For example, instead of the circular contact range, the contact range may have an elliptical shape, a square shape, or other polygonal shapes. In short, it suffices that the range in which it is considered that the communication device held over the mark 32 may come into contact is defined as the contact range.

Control of Operation Reception

In the exemplary embodiment, the easiness of the operation reception of the operation button is made different in order to prevent the erroneous operation, but the method of preventing the erroneous operation is not limited thereto.

Figure 10:
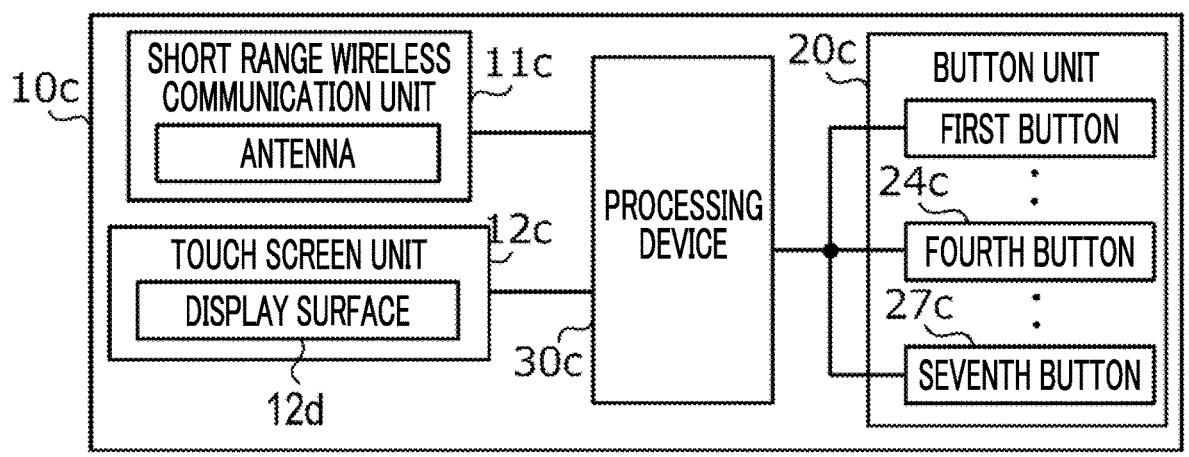
FIG. 10 is a diagram illustrating a detailed configuration of an operation panel of a modification example.

FIG. 10 illustrates a detailed configuration of an operation panel 10c according to the modification example. The operation panel 10c includes a short range wireless communication unit 11c, a touch screen unit 12c, a button unit 20c, and a processing device 30c.

The processing device 30c is a computer including a central processing unit (CPU), a memory, a storage, an interface for hardware, and the like. The processing device 30c exchanges data with the hardware and controls each operation. In addition, the processing device 30c relays the exchange between each unit of the operation panel 10c and the controller 2. For example, when the processing device 30c receives operation data from each button of the button unit 20c, the processing device 30c supplies the operation data to the controller 2 illustrated in FIG. 1.

In addition, the processing device 30c receives information (read information), which is read from the communication device allowed to approach the mark 32, from the short range wireless communication unit 11c, and supplies the information to the controller 2. At this time, when the read information is received, the processing device 30c stops the supply to the controller 2 even when the operation data is supplied from the fourth button 24c and the seventh button 27c, which are the second operation buttons, for a predetermined period.

As a result, the fourth button 24c and the seventh button 27c do not receive the operation to the own operation unit for a determined period after the short range wireless communication unit 11c reads the read information. The fourth button 24c and the seventh button 27c are examples of the "operation unit" or the "second operation unit" of the present disclosure. The period in this case is a period in which the second operation button stops receiving an operation, and is hereinafter referred to as a "stop period". As the stop period, for example, the longest period (for example, several seconds) required for the communication device performing the erroneous operation after the read information is read is used.

In the modification example, in the stop period, even when the second operation button is pressed by the communication device, the operation is not received. As a result, the erroneous operation can be more reliably prevented as compared with a case where the second operation button continues to receive the operation even during the stop period. In the modification example, the receiving of the operation by the touch screen unit 12c may also be stopped. There are two stopping methods. When the contact range B1 illustrated in FIG. 3 is used, a part of the display surface 12d of the touch screen unit 12c also is present within the contact range B1.

In the first stopping method, the processing device 30c stops the supply of the operation data, which represents an operation on the part of the display surface 12d present within the contact range B1, to the controller 2. As a result, the touch screen unit 12c does not receive an operation on the part of the own operation unit present within the contact range B1, for a determined period after the short range wireless communication unit 11c reads the read information. In this case, the part of the touch screen unit 12c that is present within the contact range B1 is an example of the "second operation unit" of the present disclosure.

In the second stopping method, the processing device 30c stops the supply of the operation data, which represents an operation on any part of the display surface 12d, to the controller 2. As a result, the touch screen unit 12c having the part present within the contact range B1 does not receive an operation on the own operation unit (regardless of the part of the own operation unit) for a determined period after the short range wireless communication unit 11c reads the read information.

In this case, the entire touch screen unit 12c is an example of the "second operation unit" of the present disclosure. Whichever stopping method is used, the erroneous operation can be more reliably prevented as compared with a case where the part of the touch screen unit 12c, which is an example of the second operation unit, continues to receive an operation even during the stop period.

Undulation

In the first exemplary embodiment, the button is easily noticed by providing a protrusion on the front surface 13S of the housing 13, such as the rib 134 illustrated in FIG. 5 and the rib 134 illustrated in FIG. 6, but the button may be easily noticed by providing a recess.

Since the slid finger is caught even by the recess, the button is more easily noticed as compared with a case where a recess is not provided on the front surface 13S. The protrusion has a role of physically preventing the slid finger from reaching the button, but the slid finger is caught by the recess, and therefore the same role is fulfilled by the recess. That is, by providing an undulation around the button, an erroneous operation is prevented as compared with a case where an undulation is not provided.

Difference in the Level of Undulations

In the first exemplary embodiment, both the rib 134 illustrated in FIG. 5, which is the first operation button, and the rib 134 illustrated in FIG. 6, which is the second operation button, are at the same level from the front surface 13S. The level of these ribs indicates the difference in level between the undulations provided on the housing 13 (the vertical difference in level between the highest part and the lowest part). In the modification example, the difference in level between the undulations may be different between the first operation button and the second operation button.

Figure 11A:
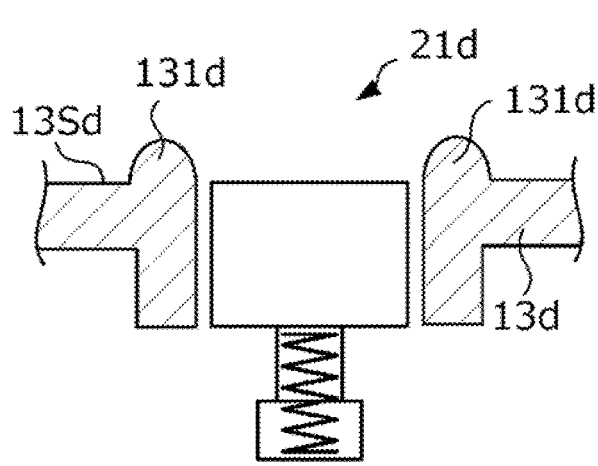
FIGS. 11A and 11B are diagrams illustrating a cross section of a rib of a modification example.
Figure 11B:
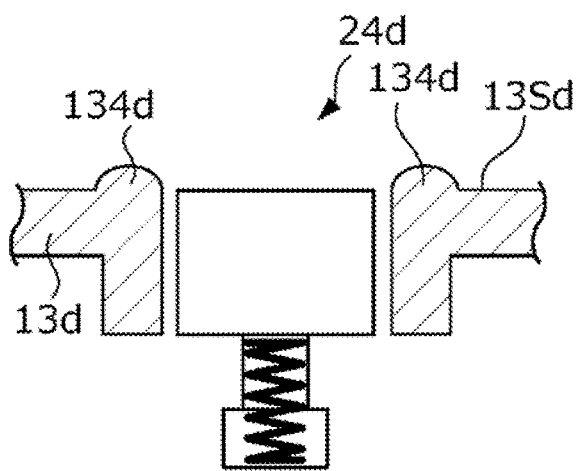

FIGS. 11A and 11B illustrate a cross section of a rib of the modification example. FIG. 11A illustrates a rib 131d around a first button 21d which is the first operation button, and FIG. 11B illustrates a rib 134d around a fourth button 24d which is the second operation button. The level of the rib 131d from the front surface 13S is higher than that of the rib 134d. Specifically, in the modification example, both the first operation button and the second operation button include a button around which a protrusion is provided, and the level difference of the protrusion around the second operation button is smaller than that of the protrusion around the first operation button.

The first operation button provided outside the contact range B1 has less erroneous operation due to contact of the communication device than the second operation button provided within the contact range B1. Therefore, an important operation such as turning on/off of a power source is assigned to the first operation button (in this example, the first button 21d). Therefore, it is important to make the button easily noticeable or to prevent an erroneous operation by using the protrusion such as the rib 131d.

On the other hand, a less important operation is often assigned to the second operation button than to the first operation button because the second operation button is so located that the contact of the communication device with it may cause an erroneous operation. As in the above examples, however, the second operation button is configured to receive the operation less easily, so that such an erroneous operation is prevented. Therefore, the level difference of the protrusion around the second operation button may not be as large as that of the protrusion around the first operation button.

In the modification example, the level difference of the protrusion (the rib 134d) around the second operation button is smaller than that of the protrusion (the rib 131d) around the first operation button. Accordingly, the first operation button is more easily noticed than the second operation button while the erroneous operation of both the first operation button and the second operation button is prevented.

In addition, it is possible to prevent the user from confusing the first operation button to which the important operation is assigned and the second operation button to which the important operation is not assigned (recognizing that the important operation is assigned to the second operation button similarly to the first operation button). The same applies to a case where a recess described in the modification example is provided instead of the protrusion. In short, in the modification example, the level difference of the undulation around the second operation button only has to be smaller than that of the undulation around the first operation button.

Reading of Information

The method of reading information by the operation panel may be different from that of the first exemplary embodiment (reading by the NFC communication). For example, a reader that reads a code such as a QR code (registered trademark) or a bar code may be provided in the housing, and information represented by the code may be read by holding a card or the like in which the code is illustrated at a position where irradiation with infrared rays or the like is performed by the reader.

In this case, the card or the like in which a code is indicated is an example of the "medium" of the present disclosure, and the reader is an example of the "reading unit" of the present disclosure. Note that, when a method of reading data through the short range wireless communication as in the first exemplary embodiment is used, the position where the medium (the communication device) is allowed to approach may be roughly determined, and therefore, the operation of allowing the medium to approach the predetermined position is simplified as compared with a case of reading information by another method (for example, a method of reading a code).

Operation Unit

The operation unit that receives the user's operation is not limited to the buttons described in the first exemplary embodiment. For example, the operation unit may be a toggle switch, a rocker switch (tumbler switch), a slide switch, a rotary switch, or the like.

In either case, it suffices that the button provided within the contact range B1 is configured to receive the operation less easily than the button provided outside the contact range B1, for example, by making the buttons different in the magnitude of the force, the movement amount, or both of them at the time of moving a movable portion of the switch. In addition, as in the above modification example, the operation on the operation unit may not be received for a predetermined period after the read information is read.

Operation Device

The device (the operation device) operated by the operation panel is not limited to the image processing apparatus described in the first exemplary embodiment. The operation device may be, for example, an image processing apparatus having only an image forming function or an image processing apparatus having only an image reading function. The operation device may be a device that performs other processing (for example, communication processing, calculation processing, and display processing) instead of image processing. In short, the operation device may be any device as long as the operation device includes a main unit whose operation is instructed by an operation on the operation panel.

Category of Disclosure

The present disclosure can be regarded as the above-described operation panel and the operation device including the operation panel. In addition, the present disclosure can be regarded as an information processing method for realizing processing executed by an operation panel, and as a program for causing a computer that controls the operation panel to function (the processing device 30c illustrated in FIG. 10). The program may be provided in a form of a recording medium such as an optical disk in which the program is stored, or may be provided in a form in which a computer downloads the program via a communication line such as the Internet, installs the program, and makes it available.

Second Exemplary Embodiment

In the second exemplary embodiment, the image processing apparatus has the hardware configuration illustrated in FIG. 1. The controller 2, the printer 3, the scanner 4, and the operation panel 10 of the image processing apparatus 1 are as described in the first exemplary embodiment.

Figure 12:
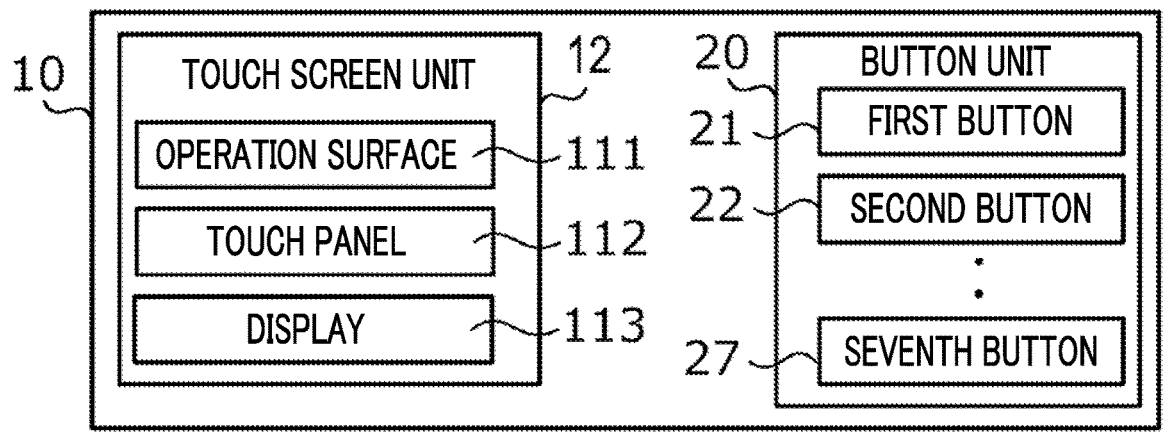
FIG. 12 is a diagram illustrating a detailed configuration of an operation panel according to a second exemplary embodiment.

FIG. 12 illustrates a detailed configuration of the operation panel 10 according to the second exemplary embodiment. The operation panel 10 includes the touch screen unit 12 and the button unit 20. The touch screen unit 12 includes an operation surface 111, a touch panel 112, and a display 113. The operation surface 111 is a surface that receives a user's operation by being instructed by an indicator (an object used for the instruction) such as a finger of the user and a stylus pen.

The touch panel 112 detects an indicated position on the operation surface 111, and receives an operation corresponding to the position. The touch panel 112 receives an operation of tapping (lightly tapping) the operation surface 111, for example. In addition, the touch panel 112 receives a flick operation and a swipe operation, that is, an operation of moving a position indicated by the indicator on the operation surface 111.

The display 113 displays various images on the operation surface 111. The display 113 displays, for example, an operator image representing an operator. That is, the operation surface 111 also serves as a display surface. The button unit 20 is a portion in which plural buttons (a type of switches operated by being pressed by a user) are disposed. In the second exemplary embodiment, the button unit 20 includes seven buttons from the first button 21 to the seventh button 27. Each button is assigned an operation such as turning on/off of a power source and starting a copy process.

Figure 13:
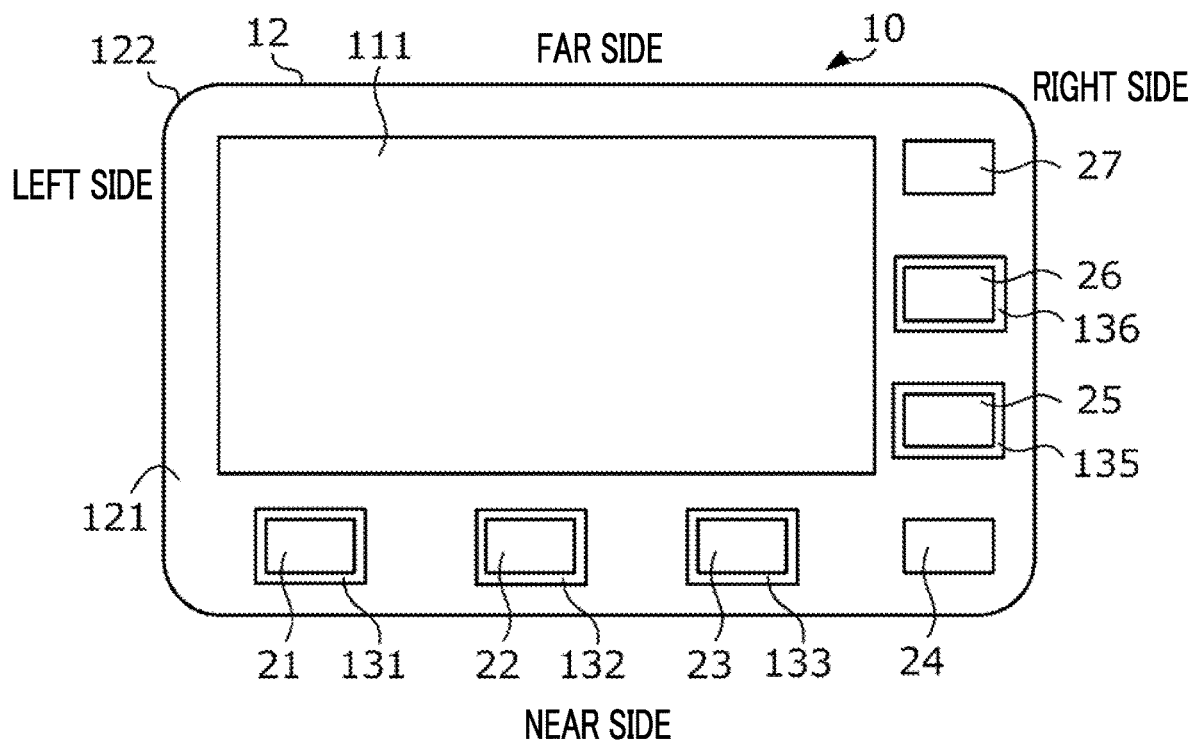
FIG. 13 is a diagram illustrating an external appearance of the operation panel.

FIG. 13 illustrates an external appearance of the operation panel 10. The operation panel 10 includes the housing 13. The housing 13 is a box-shaped member having a rectangular parallelepiped shape, and stores each unit illustrated in FIG. 12. The housing 13 has a front surface 121, and the rectangular operation surface 111 is provided on the front surface 121. Specifically, an opening having the same size and shape as the operation surface 111 is formed on the front surface 121, and the operation surface 111 is fitted into the opening.

Figure 14:
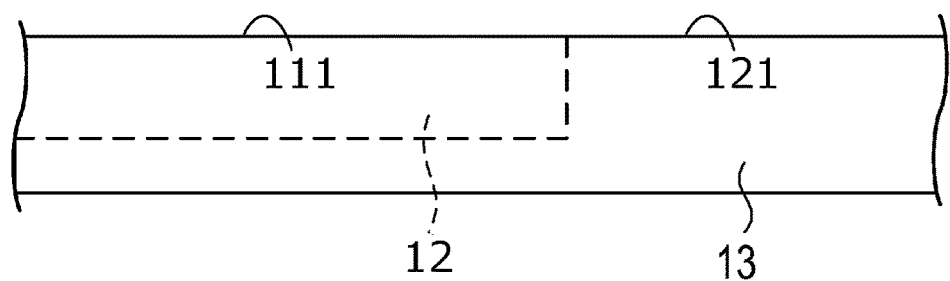
FIG. 14 is a diagram illustrating a housing as viewed from a side.

FIG. 14 illustrates the housing 13 as seen from the side. The operation surface 111 is located at a portion of the housing 13 where the touch screen unit 12 is stored. As illustrated in FIG. 14, the operation surface 111 is provided at the same level as the front surface 121. Here, the level is from the front surface 121 as a reference. The larger protrusion from the front surface 121 means the higher level, while the larger recess from the front surface 121 means the lower level.

Since the level of the front surface 121 itself is 0, the level of the operation surface 111 is also 0 as illustrated in FIG. 14. Note that the levels of the operation surface 111 and the front surface 121 do not need to be exactly the same and may have some manufacturing tolerance. In the operation panel 10 (the housing 13), a portion on a near side and a portion on a far side for the user are defined, and the operation panel 10 (the housing 13) is operated by the user standing on the near side.

The operation surface 111 is disposed close to a left corner 122 of the front surface 121 and on the far side as viewed from the user. The first button 21, the second button 22, the third button 23, and the fourth button 24 are disposed side by side on the near side of the operation surface 111 from the left side, and the fifth button 25, the sixth button 26, and the seventh button 27 are disposed side by side on the right side of the operation surface 111 from the near side. A recessed portion 131 is provided around the first button 21.

The recessed portion 131 is a portion recessed from the front surface 121. Similarly, recessed portions 132, 133, 135, and 136 are respectively provided around the second button 22, the third button 23, the fifth button 25, and the sixth button 26. On the other hand, a recessed portion is not provided around the fourth button 24 and the seventh button 27. Hereinafter, the button provided with the recessed portion is referred to as the "first operation button", and the button not provided with the recessed portion is referred to as the "second operation button". The difference between the first operation button and the second operation button will be described with reference to FIGS. 15A to 16.

Figure 15A:
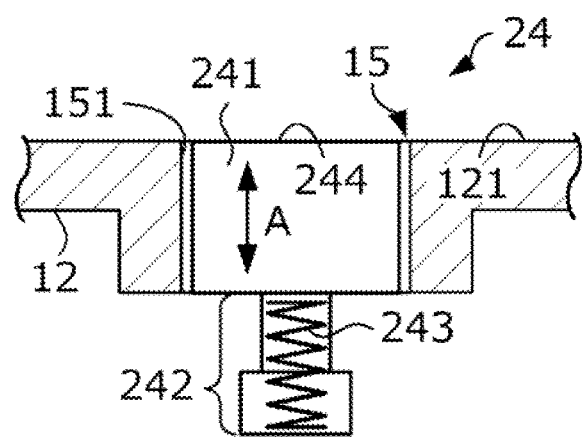
FIGS. 15A and 15B are diagrams illustrating a cross section of a fourth button.
Figure 15B:
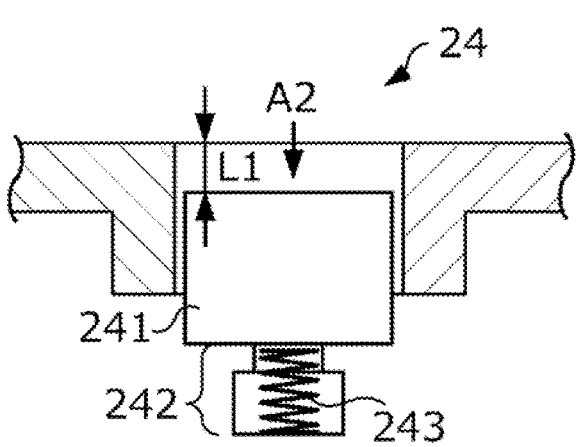

FIGS. 15A and 15B illustrate a cross section of the fourth button 24. The fourth button 24, which is one of the second operation buttons, includes the contact portion 241, the expansion and contraction portion 242, and the spring 243. The contact portion 241 is, for example, a member having a rectangular parallelepiped shape, and a finger of the user who operates the fourth button 24 contacts a rectangular contact surface 244. The contact portion 241 is disposed in the hole 15 of the housing 13, and moves in a direction along an inner circumferential surface 151 of the hole 15 (in a penetration direction A representing a direction in which the hole 15 penetrates).

The expansion and contraction portion 242 is fixed to a side of the contact portion 241 opposite to the contact surface 244. The expansion and contraction portion 242 is a member extending and contracting in the penetration direction A and is provided with the spring 243 therein. In the second exemplary embodiment, as illustrated in FIG. 15A, the fourth button 24 is provided such that the levels (the positions in the penetration direction A) of the contact surface 244 and the front surface 121 of the housing 13 are substantially the same when no force is applied to the contact surface 244.

When the user performs an operation of pushing the contact surface 244 and moves the contact portion 241 in the pushing-in direction A2 by the pushing-in amount L1, the expansion and contraction portion 242 fixed to the contact portion 241 is contracted as illustrated in FIG. 15B. As a result, for example, an open and close state of a circuit (not illustrated) is switched, and an operation corresponding to the fourth button 24 (for example, an operation for starting a copy function) is performed in conjunction therewith. When the user releases the finger from the contact surface 244, the spring 243 pushes back the contact portion 241 to return to the state illustrated in FIG. 15A.

Figure 16:
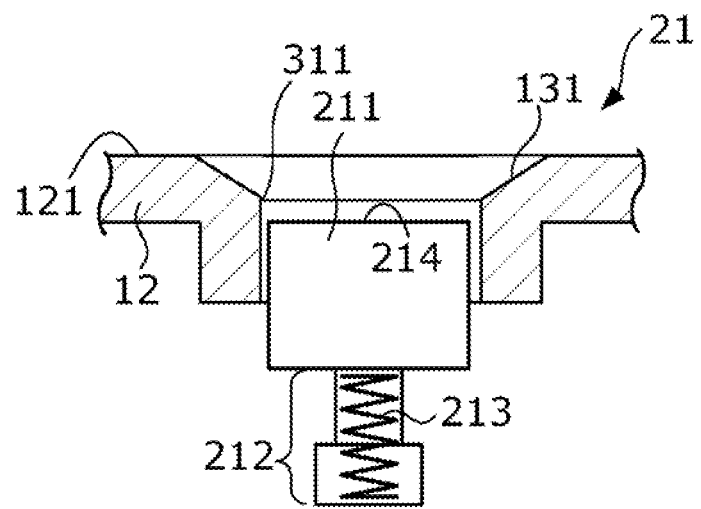
FIG. 16 is a diagram illustrating a cross section of a first button.

FIG. 16 illustrates a cross section of the first button 21. The first button 21, which is one of the first operation buttons, includes the contact portion 211, the expansion and contraction portion 212, and the spring 213. The contact portion 211, the expansion and contraction portion 212, and the spring 213 have the same shape, size, and material as the contact portion 241, the expansion and contraction portion 242, and the spring 243 of the fourth button 24, respectively (accordingly, the spring coefficient is the same). The first button 21 is different from the fourth button 24 in the disposition and the shape around the button.

The recessed portion 131 described in FIG. 13 is provided around the first button 21. The recessed portion 131 that surrounds the first button 21 is a portion that is recessed from the front surface 121. That is, the level of the recessed portion 131 is lower than the level (level from the front surface 121) of the front surface 121. The first button 21 is provided such that the level of the contact portion 211 from the front surface 121 is lower than the lower end 311 of the recessed portion 131 when no force is applied to the contact surface 214.

That is, the level of the recessed portion 131 from the front surface 121 is higher than that of the first button 21 which is the first operation button. This means that both the recessed portion 131 and the first button 21 are located lower than the front surface 121 and the recessed portion 131 is provided at a position closer to the front surface 121 than the first button 21.

When the first button 21 and the fourth button 24 are compared, since the springs are the same, the pushing-in amount after the contact surface is touched does not change. However, the first button 21 has a recessed contact surface and thus is less easy to push than the fourth button 24. On the contrary, as compared with the first button 21, the fourth button 24 is easily pushed because the contact surface of the fourth button 24 is located higher than the first button 21. The relationship of the pushability is the same for other first operation buttons and second operation buttons (the second operation button is more easily pushed than the first operation button). The disposition of the first operation button and the second operation button will be described with reference to FIGS. 17A and 17B.

Figure 17A:
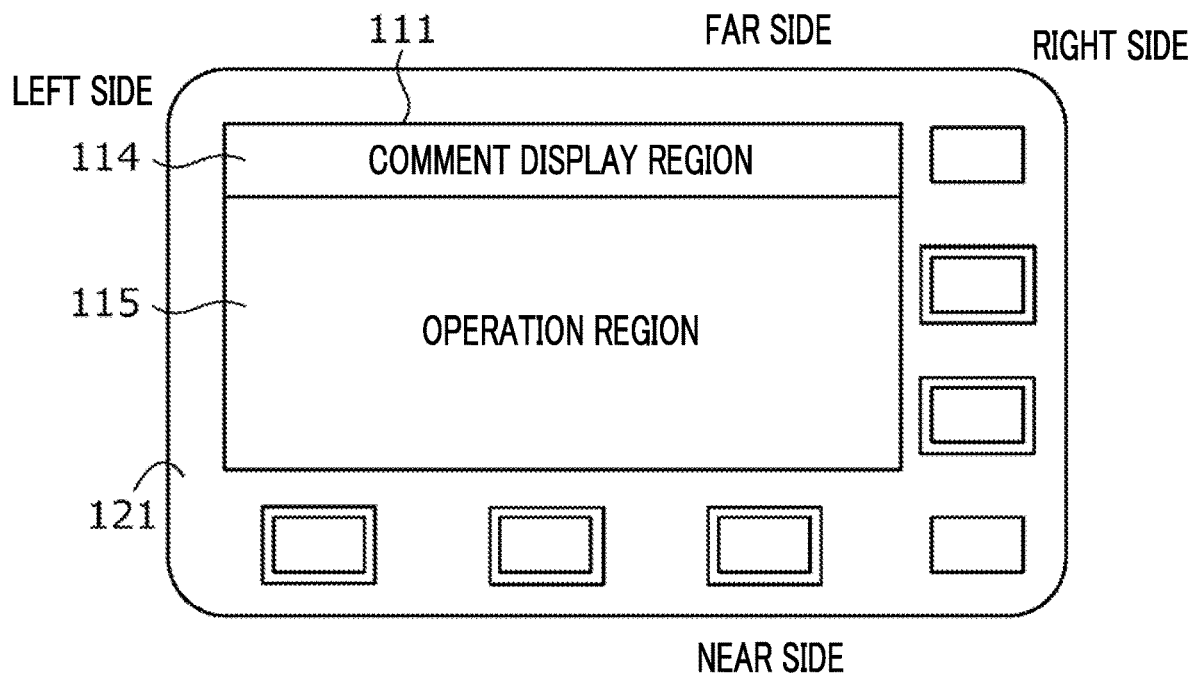
FIGS. 17A and 17B are diagrams illustrating an example of an operation method of the operation panel.
Figure 17B:
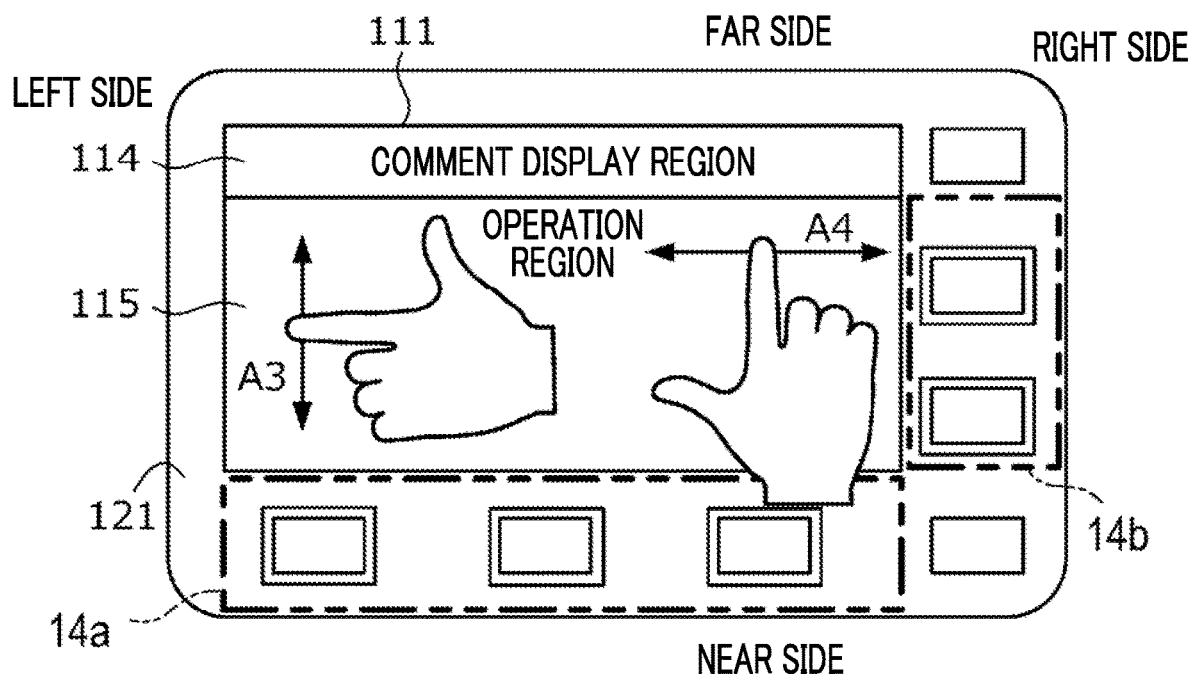

FIGS. 17A and 17B illustrate an example of an operation method of the operation panel 10. As illustrated in FIG. 17A, the operation panel 10 displays a comment in a comment display region 114 disposed on the far side of the operation surface 111, and displays an operator image in an operation region 115 disposed on the near side thereof. Examples of the comment include a comment instructing the user to use the operation panel 10 (such as "Please input the number of copies") and a comment informing the user of the state of the operation panel 10 (such as "Copy in progress").

The operator image is an image that functions in the same manner as an operator such as a button. When a tap operation, a flick operation, a swipe operation, or the like is performed on the operator image, the operation panel 10 receives the operation, and the image processing apparatus 1 performs a corresponding operation. Among the operations on the operator image, the flick operation and the swipe operation are operations (hereinafter referred to as "movement operations") of moving a position indicated by the indicator on the operation surface 111 (a finger or the like of the user) as illustrated in FIG. 17B.

In the operation panel 10, it is assumed that an operation of moving the indicated position in a short side direction A3 along the short side of the operation surface 111 and an operation of moving the indicated position in a long side direction A4 along the long side of the rectangular operation surface 111 are performed as movement operations. The operation of moving the indicated position in the short side direction A3 is, for example, an operation of scrolling the screen in the short side direction A3. The operation of moving the indicated position in the long side direction A4 is an operation of scrolling the screen in the long side direction A4, an operation of switching the screen, and the like.

Actually, it is conceivable that the indicated position is moved obliquely, or the movement direction is changed halfway, but in the second exemplary embodiment, the movement direction of the indicated position is limited to these two directions for easy understanding of the description. However, this limitation is for the purpose of explanation only, and a movement operation of moving the indicated position obliquely may be performed.

In the movement operation, it is possible to move the indicator to the outside of the operation surface 111 with excessive force. In this case, when the indicator pushes a button provided on the outside of the operation surface 111, an erroneous operation (user's unintentional operation) occurs. In FIG. 17B, an erroneous operation may occur by the indicator straying from the operation surface 111, and an erroneous operation warning region 14a on the near side of the operation surface 111 and an erroneous operation warning region 14b on the right side of the operation surface 111 are illustrated as regions in which an erroneous operation is warned.

The erroneous operation warning regions 14a and 14b are regions around the operation surface 111 which are present on the extension in the direction in which the position indicated by the movement operation is moved. Specifically, the erroneous operation warning region 14a is a region present on the extension of the operation region 115, in which the movement operation is performed, in the short side direction A3. The erroneous operation warning region 14b is a region present on the extension of the operation region 115, in which the movement operation is performed, in the long side direction A4.

Incidentally, a region on the extension of the short side direction A3 is present on the far side of the operation region 115, and a region on the extension in the long side direction A4 is present on the left side of the operation region 115, but since no button is disposed in these regions, the illustration is omitted here. The first operation button is provided in the erroneous operation warning regions 14a and 14b to receive the user's operation. The first operation button is an example of the "first operation unit" of the present disclosure.

The second operation button is provided outside the erroneous operation warning regions 14a and 14b to receive the user's operation. The second operation button is an example of the "second operation unit" of the present disclosure. As described above, the second operation button is more easily pushed than the first operation button. Contrarily, the first operation button is less easy to push than the second operation button. Thus, even when the indicator moving on the operation surface 111 strays from the operation region 115 and comes into contact with the first operation button during the movement operation, the operation is less likely to be received than when the indicator comes into contact with the second operation button.

If the second operation button is provided in the erroneous operation warning regions 14a and 14b, when the indicator moving on the operation surface 111 strays from the operation region 115 and comes into contact with the operation region 115 during the movement operation, the operation on the second operation button is more easily received as compared with the first operation button. Therefore, the second operation button is provided outside the erroneous operation warning regions 14a and 14b such that the erroneous operation hardly occurs. By disposing the first operation button and the second operation button as described above, the erroneous operation of the operation unit around the touch panel 112 is prevented as compared with a case where the erroneous operation warning region is not considered in the disposition of these buttons.

In the second exemplary embodiment, the first operation button is surrounded by the recessed portion. As a result, even when the finger that has performed the movement operation strays from the operation surface 111, the user notices the recessed portion before touching the first operation button. Therefore, an erroneous operation is less likely to occur than when the recessed portion is not provided. In the second exemplary embodiment, even when the finger does not stop at the recessed portion and touches the first operation button, an erroneous operation is less likely to occur than when the first operation button is located higher than the recessed portion because the first operation button is located further lower than the recessed portion.

Further, when the finger is slid along the front surface 121, the erroneous operation of the first operation button is prevented as described above. However, when the user pushes the first operation button from above for operation, pushing is not as less easy as when the user slides his/her finger from the side because the contact surface is located slightly lower from the front surface 121. As described above, in the second exemplary embodiment, the erroneous operation on the operation panel is prevented, and the deterioration of the usability of the normal operation unit is prevented.

Modification Example

The second exemplary embodiment described above is only an example of the present disclosure, and may be modified as follows. The second exemplary embodiment and each modification example may be implemented in combination as necessary.

Surrounding of First Operation Button

In the second exemplary embodiment, a recess is provided around the first operation button, but the disclosure is not limited thereto.

Figure 18:
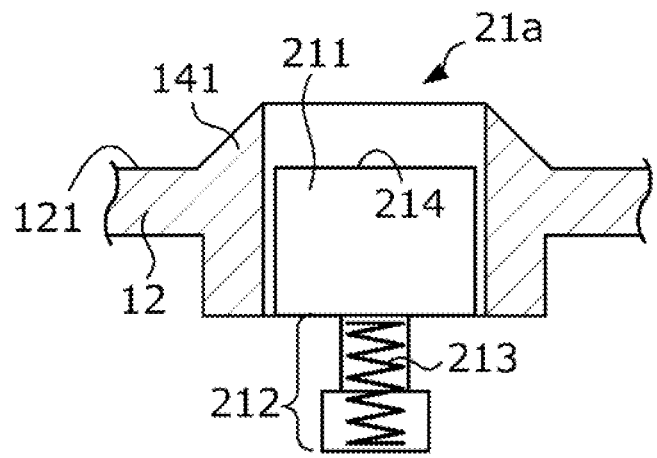
FIG. 18 is a diagram illustrating a cross section of a first button of a modification example.

FIG. 18 illustrates a cross section of a first button 21a of the modification example. The first button 21a includes the contact portion 211, the expansion and contraction portion 212, and the spring 213, similarly to the second exemplary embodiment. A protrusion portion 141 is provided around the first button 21a.

The protrusion portion 141 a portion protruding from the front surface 121. That is, the protrusion portion 141, which is a portion surrounding the first button 21a, is at a level higher than that of the front surface 121. The level of the protrusion portion 141 from the front surface 121 is higher than that of the first button 21a, which is the first operation button. In the modification example, even when the finger that has performed the movement operation strays from the operation surface 111, the user notices the protrusion portion 141 before touching the first operation button, as in the case of the recessed portion of the second exemplary embodiment.

Therefore, an erroneous operation is less likely to occur than when the protrusion portion 141 is not provided. Further, even when the finger does not stop at the protrusion portion 141 and touches the first operation button, since the first operation button is located lower than the protrusion portion 141, the erroneous operation is prevented as compared with a case where the first operation button is located higher than the protrusion portion 141. Since the protrusion portion also plays a role of preventing the movement of the finger of the user, the contact with the first operation button is prevented as compared with a case where the recessed portion is provided.

On the other hand, in the case where the recessed portion is provided as in the second exemplary embodiment, since the front surface 121 does not protrude, the design of the front surface 121 becomes simple. In each of the above-described examples, the recessed portion and the protrusion portion are provided over the entire periphery of the first operation button, but the disclosure is not limited to this, and the recessed portion and the protrusion portion may be provided only partially. In this case, it suffices that the recessed portion and the protrusion portion are provided at least on the operation surface 111 side.

Figure 19:
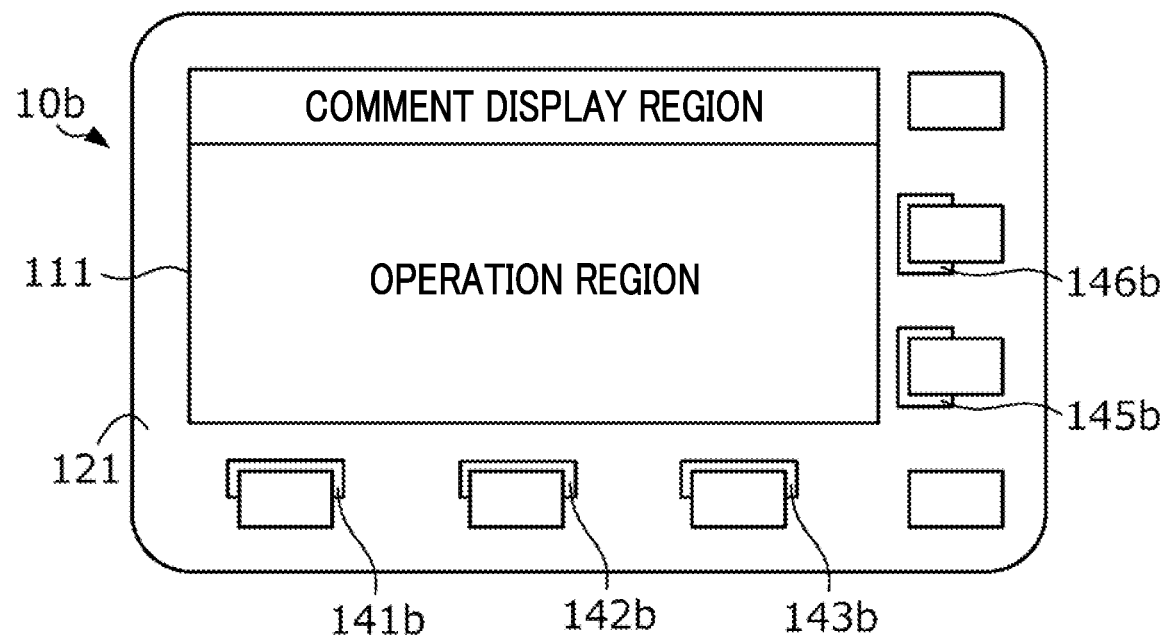
FIG. 19 is a diagram illustrating an external appearance of an operation panel of a modification example.

FIG. 19 illustrates the external appearance of the operation panel 10b of the modification example. The operation panel 10b is provided with protrusion portions 141b, 142b, 143b, 145b, and 146b provided in a half range on the operation surface 111 side around of the first operation buttons. Each of these protrusion portions is at a level higher than that of the front surface 121. Even in this case, the user notices the protrusion portion 141b, 142b, 143b, 145b, or 146b before the finger that has performed the movement operation touches the first operation button.

In addition, undulations may not be provided around the first operation button.

FIG. 20 illustrates a cross section of a first button 21c of the modification example. The first button 21c includes the contact portion 211, the expansion and contraction portion 212, and the spring 213, similarly to the second exemplary embodiment. Neither the recessed portion nor the protrusion portion is provided around the first button 21c. That is, the portion surrounding the first button 21c is at the same level as the front surface 121.

However, the portion surrounding the first button 21c is at a level higher than that of the first button 21c from the front surface 121. That is, the contact surface 214 of the first button 21c is provided at a position lower than the front surface 121. In this disposition, the first button 21c is also less easy to push than the second operation button. In the example of FIG. 20, the design of surface 121 is further simplified because the front surface 121 does not have a protrusion such as the protrusion portion and a concave portion such as the recessed portion.

Kinetic Energy Variation

In the second exemplary embodiment, the first operation button is located lower than the front surface 121 and thus less easy to push than the second operation button, which makes the reception of the operation less easy. However, the method of making the reception of the operation less easy is not limited to this. Each of the first operation button and the second operation button is an operator that receives an operation by being moved by the user. Therefore, the reception of the operation may be made less easy by providing different levels of kinetic energy for the buttons to be moved.

FIGS. 21A and 21B illustrate a cross section of the first button 21d of the modification example. As illustrated in FIG. 21A, the first button 21d includes a contact portion 211d, an expansion and contraction portion 212d, and a spring 213d. The first button 21d is provided such that the levels of the contact surface 214d and the front surface 121 are substantially the same when no force is applied to the contact surface 214d of the contact portion 211d. The lengths of the expansion and contraction portion 212d and the spring 213d in the penetration direction A are longer than the lengths of the expansion and contraction portion 212 and the spring 213 of the second exemplary embodiment.

Therefore, as illustrated in FIG. 21B, when the user pushes the contact surface 214d and moves the contact portion 211d in the pushing-in direction A2 by the pushing-in amount L2 larger than the pushing-in amount L1, an operation corresponding to the first button 21d is performed. On the other hand, since the spring 213d has the same thickness, the same number of turns, and the same coil diameter as those of the spring 243 illustrated in FIGS. 15A and 15B and the spring 213 illustrated in FIG. 16 described in the second exemplary embodiment, the spring 213d has the same spring constant as the spring 243 illustrated in FIGS. 15A and 15B and the spring 213 illustrated in FIG. 16 but has a longer length in the penetration direction A.

Therefore, in the modification example, the amount of movement (hereinafter referred to as "stroke") required when the first operation button is moved is larger than that required of the second operation button, and the kinetic energy for moving the first operation button until the operation is received is larger. Thus, similar to the second exemplary embodiment, the first operation button receives the operation less easily than the second operation button, so that an erroneous operation is less likely to occur than when the ease of the operation reception is not different between the first and second operation buttons.

Further, in the example of FIGS. 21A and 21B, since the first operation button is at the same level as the front surface 121, the appearance of the second operation button is not changed. The method of making the kinetic energies different from each other is not limited to the above method.

FIGS. 22A and 22B illustrate a cross section of a first button 21e of the modification example. As illustrated in FIG. 22A, the first button 21e includes a contact portion 211e, an expansion and contraction portion 212e, and a spring 213e.

The first button 21e is provided such that the levels of the contact surface 214e and the front surface 121 are substantially the same when no force is applied to the contact surface 214e of the contact portion 211e. The spring 213e has the same number of turns, the same coil diameter, and the same length in the penetration direction A as those of the spring 243 (the spring of the second operation button) illustrated in FIGS. 15A and 15B, but is thicker, and therefore has a large spring constant (that a large force is required for deforming the spring).

In the first button 21e, when the user pushes the contact surface 214e and moves the contact portion 211e in the pushing-in direction A2 by the pushing-in amount L1 as illustrated in FIG. 22B, an operation corresponding to the first button 21e is performed. That is, the strokes of the first operation button (first button 21e) and the second operation button are the same. However, since the first operation button uses a spring having a larger spring constant than the spring constant of the spring of the second operation button, the repulsion force when the first operation button is moved is large, and the kinetic energy described above is large.

Therefore, when the operation is performed by applying the same force, the operation is received less easily by the first operation button than by the second operation unit. Therefore, also in the example of FIGS. 22A and 22B, the erroneous operation is prevented in the same manner as in the example of FIGS. 21A and 21B. Further, in the example of FIGS. 22A and 22B, since the repulsion force is increased, the stroke may not be increased, and therefore, the size of the first operation button in the penetration direction A is reduced as compared with the case where the stroke is increased. On the other hand, in the case where the stroke is increased, the following can be said.

For example, when the palm erroneously pushes the first operation button, the pushing-in amount is not large because the palm is caught by the front surface 121, but a strong force may be applied as compared with a case where only the finger pushes the first operation button. In this case, even when the spring constant is increased, if the stroke remains small, there is a possibility of an erroneous operation. However, when the stroke is increased, the first operation button is likely not to be pushed enough so that the operation is received due to the interference of the palm of the user's hand. As described above, according to the example of FIGS. 21A and 21B, the erroneous operation when a large force is applied by an object with a large area is prevented as compared with a case where the stroke is not increased.

Second Operation Button

The second operation button is not limited to the button illustrated in FIGS. 15A and 15B. For example, in the example of FIGS. 15A and 15B, the level of the contact surface is substantially the same as that of the front surface 121 of the housing 13, but the contact surface may protrude from the front surface 121 or may be recessed. In addition, a recessed portion or a protrusion portion may be provided around the second operation button. It suffices that it is easier for all the second operation buttons to receive an operation than it is for the first operation button, for example, the second operation button is not recessed as much as the first operation button, and the recessed portion is shallower or the protrusion portion is lower than the first operation button.

Operation Unit

The operation unit that receives the user's operation is not limited to the button having a rectangular contact surface described in the second exemplary embodiment. For example, the button may have another shape such as a circular shape or an elliptical shape. Instead of a button, a toggle switch, a rocker switch (tumbler switch), a slide switch, a rotary switch, or the like may be used. In such an operation unit, it suffices that the pushability of the first operation unit and the pushability of the second operation unit are different from each other by making the magnitude of the force, the movement amount, or both the magnitude of the force and the movement amount at the time of moving a movable portion of the switch different as in the modification example.

Pushable Range of Contact Surface of Button

The button is an operation unit that moves in a direction in which the contact surface is pushed when the user pushes the contact surface, and receives an operation. Some buttons receive an operation by the contact portion being obliquely pushed even when the corner of the contact surface is pushed. This pushing method is called "corner pushing".

Buttons that can be corner pushed are easier to be pushed than buttons that cannot be corner-pushed. Therefore, in the modification example, a button that cannot be corner pushed is used as the first operation button, and a button that can be corner-pushed is used as the second operation button.

Figure 23A:
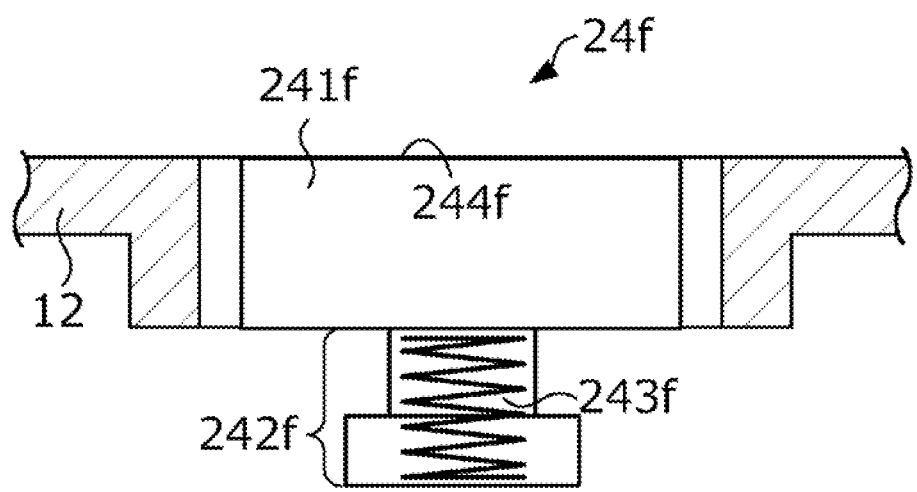
FIGS. 23A and 23B are diagrams illustrating a cross section of a second operation button which can be corner-pushed.
Figure 23B:
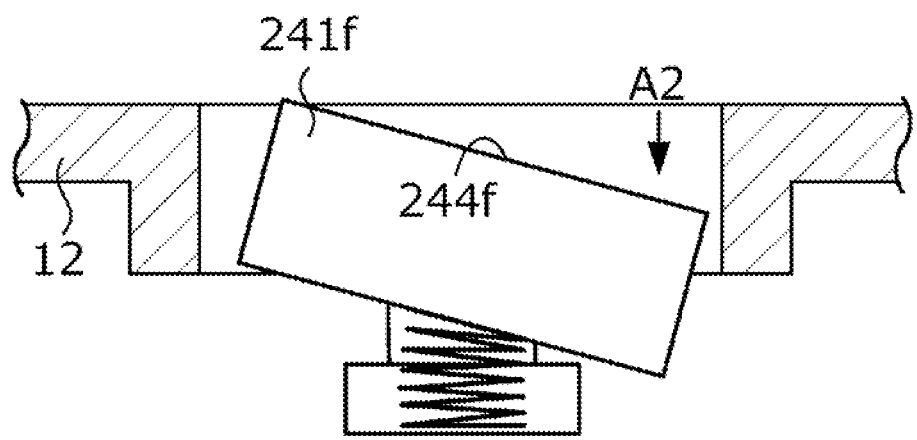

FIGS. 23A and 23B illustrate a cross section of a second operation button which can be corner-pushed. In FIGS. 23A and 23B, a fourth button 24f including a contact portion 241f, an expansion and contraction portion 242f, and a spring 243f is illustrated.

As illustrated in FIG. 23A, a gap between the contact portion 241f and the housing 13 is larger than that of the fourth button 24 of the second exemplary embodiment illustrated in FIGS. 15A and 15B. Therefore, when the corner of the contact surface 244f is pushed in the pushing-in direction A2, the contact surface 244f is obliquely pushed as illustrated in FIG. 23B. Also in this case, the expansion and contraction portion 242f is contracted to receive the operation. A button that can be corner pushed and a button that cannot be corner-pushed are different in the pushable range of the contact surface.

Figure 24A:
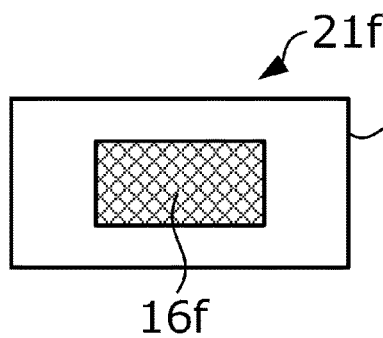
FIGS. 24A and 24B are diagrams illustrating a pushable range of a contact surface.
Figure 24B:
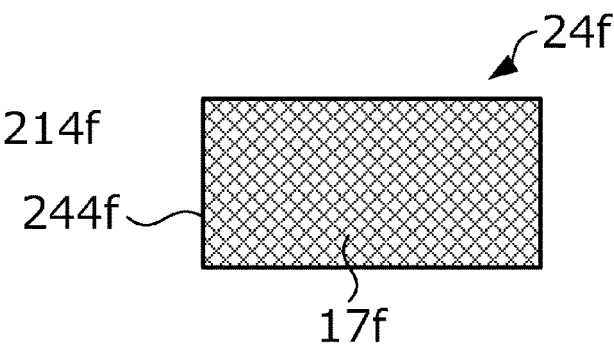

FIGS. 24A and 24B illustrate a pushable range of the contact surface. In FIG. 24A, a pushable range 16f of a contact surface 214f of a first button 21f, which is the first operation button, is illustrated. In the case of the first button 21f, the contact portion tends to become oblique when the corner of the contact portion is pushed, but the contact portion comes into contact with the housing 13 immediately because the gap between the contact portion and the housing 13 is small. Then, friction acts on a portion between the contact portion and the housing 13 and thus the contact portion is not pushed in the pushing-in direction A2.

Therefore, the pushable range 16f is a range in which the contact portion is pushed without becoming oblique when the contact portion is pushed, that is, a range near the center of the contact surface 214f. In FIG. 24B, a pushable range 17f of the contact surface 244f of the fourth button 24f, which is the second operation button, is illustrated. Since the fourth button 24f can be corner-pushed, the entire surface of the contact surface 244 is the pushable range 17f.

Thus, in the modification example, the first operation button has a range, in which the contact surface pushed by the user is moved in the pushed direction when the force is applied (the pushable range illustrated in FIGS. 24A and 24B), narrower than the second operation button. Due to the difference in the range, the first operation button is less easy to push than the second operation button as in the second exemplary embodiment, so that the erroneous operation of the operation unit around the touch panel 112 is prevented.

In addition, in the modification example, neither the protrusion portion nor the recessed portion is required for the front surface 121, so that the design of the front surface 121 is simplified. In the example of FIGS. 24A and 24B, the contact portion is not inclined at all when the first operation button is pushed, but may be pushed in a state of being inclined somewhat. Even in this case, when the pushable range of the contact surface of the first operation button is narrower than that of the second operation button, the first operation button is less easy to push than the second operation button, and thus, the erroneous operation is prevented in the same manner as described above.

Control of Receiving Operation

In the second exemplary embodiment, the easiness of the operation reception of the operation button is made different in order to prevent an erroneous operation, but the method of preventing the erroneous operation is not limited thereto.

Figure 25:
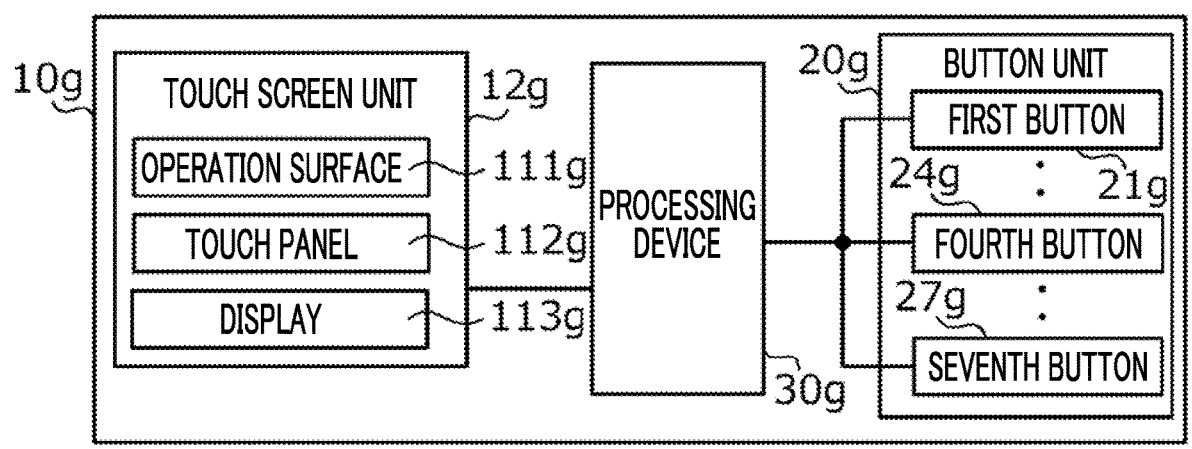
FIG. 25 is a diagram illustrating a detailed configuration of an operation panel of a modification example.

FIG. 25 illustrates a detailed configuration of an operation panel 10g of the modification example. The operation panel 10g includes a touch screen unit 12g, a button unit 20g, and a processing device 30g.

The touch screen unit 12g includes an operation surface 111g, a touch panel 112g, and a display 113g. The button unit 20g includes seven buttons from a first button 21g to a seventh button 27g. In the modification example, these buttons can control whether or not to receive an operation. The control is performed by the processing device 30g.

The processing device 30g is a computer including a central processing unit (CPU), a memory, a storage, an interface for hardware, and the like. The processing device 30g exchanges data with the hardware and controls each operation. In addition, the processing device 30g relays the exchange between each unit of the operation panel 10g and the controller 2. For example, when the processing device 30g receives operation data from each button of the button unit 20g, the processing device 30g supplies the operation data to the controller 2 illustrated in FIG. 12.

When the processing device 30g receives the operation data from the touch panel 112g, the processing device 30g supplies the operation data to the controller 2 illustrated in FIG. 12. The operation data supplied from the touch panel 112g is data representing a position indicated by an indicator such as a finger of the user. When the position represented by the operation data (indicated position) is moved to the end of the operation surface 111g and the indicated position is no longer detected, the processing device 30g performs control such that the button of the button unit 20g does not receive the operation.

The processing device 30g is an example of the "control unit" of the present disclosure. More specifically, when the indicated position is not detected, the processing device 30g stops the supply to the controller 2 for a predetermined period even when the operation data is supplied from each button of the button unit 20g. As a result, even when each button of the button unit 20g is pushed during the period (stop period of the operation reception), the operation is not received. These buttons are an example of the "operation unit" of the present disclosure.

In the modification example, for example, an experiment of reproducing a process in which an erroneous operation is performed by the indicator (finger or the like) straying from the operation surface 111 is performed, and the time from when the indicator strays from the operation surface 111 to when the erroneous operation is performed is measured. Then, an average value of the measured time (for example, several seconds) is used as the stop period of the operation reception. In the modification example, even when the finger straying from the operation surface 111 pushes the button, the operation is not received during the stop period of the operation reception. As a result, the erroneous operation is prevented in the stop period as compared with a case where the operation is continuously received.

The processing device 30g may perform control such that during the stop period of the operation reception, the operation of only the first operation button is received and the operation of the second operation button is received. As a result, while the erroneous operation on the first operation button is prevented, the operation on the second operation button provided within a region where the possibility of the erroneous operation is small can be performed immediately after the operation on the operation surface 111.

The method of stopping the operation reception is not limited to the above method. For example, each button may be provided with a control circuit, and when the processing device 30g instructs the control circuit to stop receiving the operation, the control circuit may stop the supply of the operation data to the processing device 30g. Also in this method, when the finger straying from the operation surface 111 pushes the button, the operation is not received in the stop period of the operation reception.

Erroneous Operation Warning Region

The erroneous operation warning region in which the erroneous operation may occur is not limited to the regions illustrated in FIG. 17B.

Figure 26:
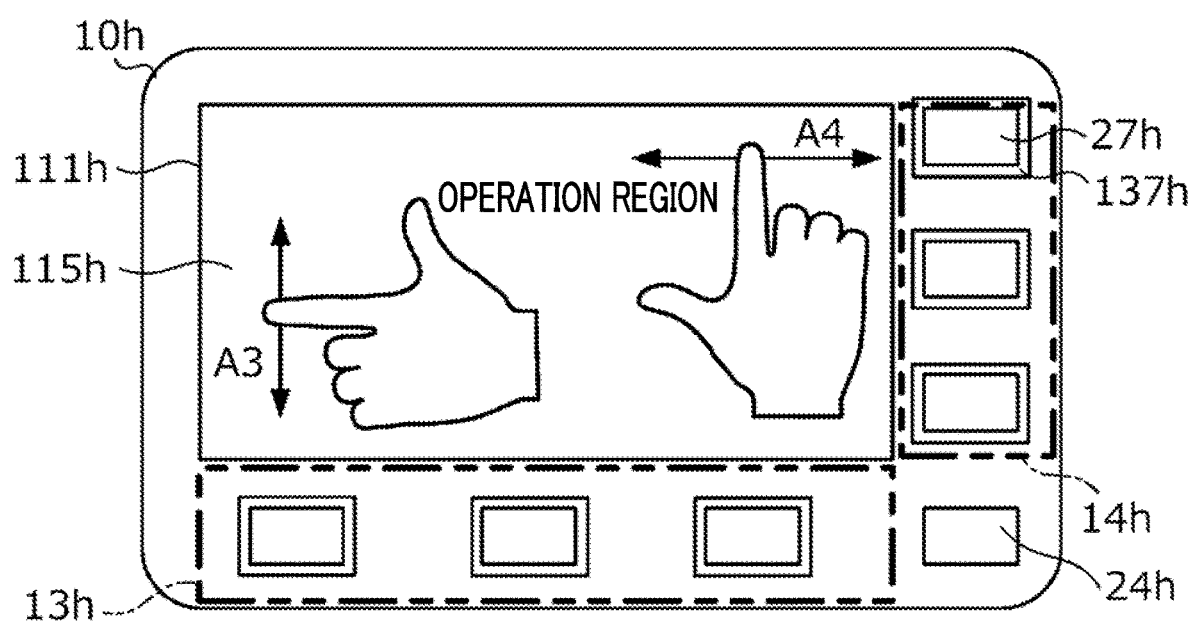
FIG. 26 is a diagram illustrating an example of an operation method of an operation panel of a modification example.

FIG. 26 illustrates an example of an operation method of an operation panel 10h of the modification example. An operation region 115h is displayed on the entire operation surface 111h of the operation panel 10h. In this case, a region present on the extension of the operation region 115h in the short side direction A3 becomes an erroneous operation warning region 13h, and a region present on the extension of the operation region 115h in the long side direction A4 becomes an erroneous operation warning region 14h.

The erroneous operation warning region 14h is longer in the short side direction A3 than the erroneous operation warning region 14b illustrated in FIGS. 17A and 17B, and includes all three buttons disposed on the right side of the operation surface 111h. Therefore, the button, which is on the most far side and is the second operation button in the second exemplary embodiment, is a seventh button 27h (that is, the first operation button) surrounded by a recessed portion 137h. In the example illustrated in FIG. 26, the indicator (finger or the like) that has performed the movement operation may stray to the position where the seventh button 27h is disposed, and thus the seventh button 27h as the first operation button is configured to be less easy to push than the second operation button (in this example, only the fourth button 24h), so that the erroneous operation is prevented.

Figure 27:
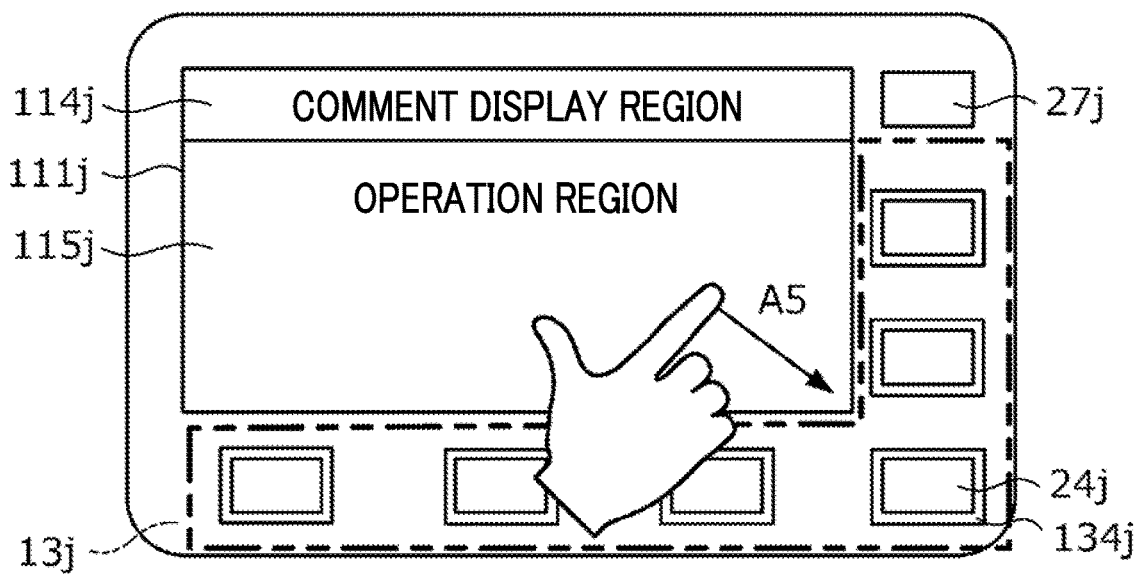
FIG. 27 is a diagram illustrating an example of an operation method of an operation panel of a modification example.

FIG. 27 illustrates an example of a method for operation of an operation panel according to the modification example. On an operation surface 111j of the operation panel 10j, a comment display region 114*j* and an operation region 115*j* are displayed as in the example of FIGS. 17A and 17B. However, in the example of FIG. 27, it is assumed that an operation of moving the indicated position in the right downward oblique direction A5 is performed as the movement operation, in addition to the short side direction A3 and the long side direction A4. In this case, an L-shaped region obtained by combining a region present on the extension of the operation region 115*j* in the short side direction A3, a region present on the extension of the operation region 115*j* in the long side direction A4, and a region present on the extension of the operation region 115*j* in the oblique direction A5 becomes an erroneous operation warning region 13*j*.

The erroneous operation warning region 13*j* includes a fourth button 24*j* on the lower right side, in addition to the buttons on the near side and the far side of the operation region 115*j*. Therefore, the fourth button 24*j* serves as the first operation button surrounded by a recessed portion 134*j*, and is configured to be less easy to push than the second operation button (in this example, only a seventh button 27*j*). As a result, an erroneous operation on the fourth button 24*j* is also prevented.

Note that the indicated position is not always straightly moved like the short side direction A3, the long side direction A4, and the oblique direction A5 because the indicated position is moved by a person. For example, an arc or a wavy locus may be drawn. In addition, for example, even when the indicated position is moved in the short side direction A3, the movement direction may be slightly different each time the operation is performed. However, for example, in the case of an operation of scrolling the screen, the movement amount of the indicated position in a direction excluding the scrolling direction does not affect the operation. In this case, it suffices that the erroneous operation warning region is defined with the scrolling direction being the movement direction of the indicated position.

Similarly, in the case of a flick operation of when a Japanese character is input, regardless of the actual movement direction of the indicated position, it suffices that the erroneous operation warning region is defined with the four directions (up, down, left, and right directions) being the movement direction of the indicated position. In addition, for example, when an operation of moving an icon to the end of the operation surface 111 and releasing the icon out of the screen is performed as an operation of deleting the icon, the trajectory of the indicated position may have various shapes and directions. In this case, for example, it suffices that the erroneous operation warning region is defined with a direction orthogonal to the end of the operation surface 111 (a direction in which the indicated position is likely to be moved) being a movement direction.

In addition, for example, the erroneous operation warning region may be defined such that any number of users may be asked to try the operation of deleting the icon, and the average direction of the movement direction of the indicated position drawn by the users is regarded as the movement direction. In short, it suffices that a region in which the indicator may be erroneously moved to the outside of the operation surface 111 when the user using the operation panel performs a movement operation is defined as an erroneous operation warning region.

Operation Surface

In the second exemplary embodiment, the operation surface 111 also serves as a display surface, but the disclosure is not limited thereto, and the display surface may be provided separately. In this case, a device called a touch pad is used as a touch panel, and the user operates an operation surface on which an image is not displayed.

Operation Device

The device operated by the operation panel (operation device) is not limited to the image processing apparatus described in the second exemplary embodiment. The operation device may be, for example, an image processing apparatus having only an image forming function or an image processing apparatus having only an image reading function. The operation device may be a device that performs other processing (for example, communication processing, calculation processing, and display processing) instead of image processing. In short, the operation device may be any device as long as the operation device includes a main unit whose operation is instructed by an operation on the operation panel.

Category of Disclosure

The present disclosure can be regarded as the above-described operation panel and the operation device including the operation panel. In addition, the present disclosure can be regarded as an information processing method for realizing processing executed by an operation panel, and as a program for causing a computer that controls the operation panel to function (the processing device 30*g* illustrated in FIG. 25). The program may be provided in a form of a recording medium such as an optical disk in which the program is stored, or may be provided in a form in which a computer downloads the program via a communication line such as the Internet, installs the program, and makes it available.

Third Exemplary Embodiment

In the third exemplary embodiment, the image processing apparatus has the hardware configuration illustrated in FIG. 1. The controller 2, the printer 3, the scanner 4, and the operation panel 10 of the image processing apparatus 1 are as described in the first exemplary embodiment. The image processing apparatus 1 is an example of the "operation device" and the "device to be operated" of the present disclosure, and the controller 2, the printer 3, and the scanner 4 are an example of the "main unit" according to the present disclosure.

Figure 28:
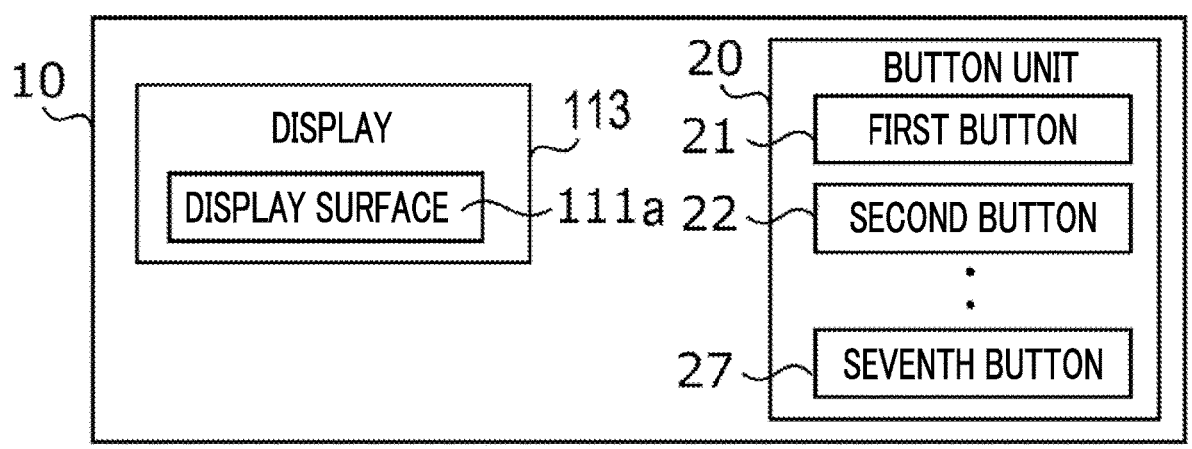
FIG. 28 is a diagram illustrating a detailed configuration of the operation panel.

FIG. 28 illustrates a detailed configuration of the operation panel 10 according to the third exemplary embodiment. The operation panel 10 includes the display 113 and the button unit 20. The display 113 includes a display surface 111*a*. The display 113 displays various images on the display surface 111*a*. The button unit 20 is a portion in which plural buttons (a type of switches operated by being pressed by a user) are disposed. In the third exemplary embodiment, the button unit 20 includes seven buttons from the first button 21 to the seventh button 27. Each button is assigned an operation such as turning on/off of a power source and starting a copy process.

Figure 29:
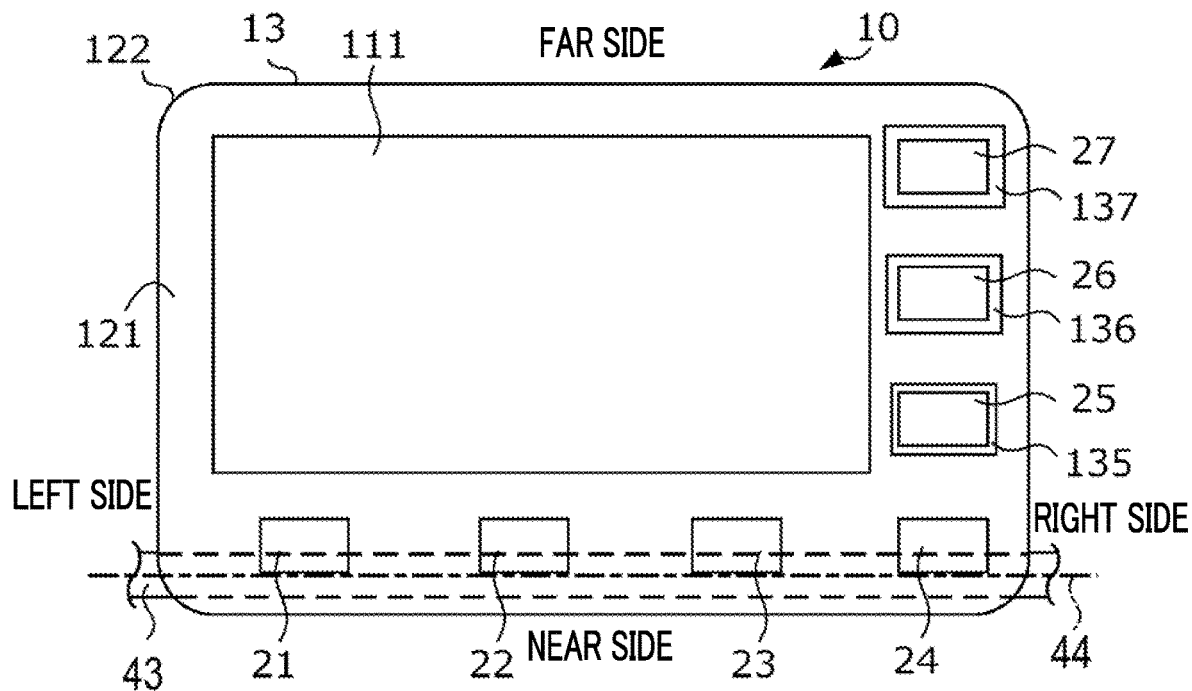
FIG. 29 is a diagram illustrating an external appearance of the operation panel.

FIG. 29 illustrates the external appearance of the operation panel 10. The operation panel 10 includes the housing 13. The housing 13 is a hollow plate-shaped member having a rectangular parallelepiped shape, and stores each unit illustrated in FIG. 28. The term "plate-shaped" as used herein does not mean a shape that can be completely gripped by hand, such as a "bar shape" (for example, the shape of a remote controller for a television) but means a shape that has two surfaces as the front and rear surfaces with a certain size and thus needs to be held at end portions. The housing 13 is thick enough to grasp the end with one hand. In the operation panel 10 (the housing 13), a portion on a near side and a portion on a far side for the user are defined, and the operation panel 10 (the housing 13) is operated by the user standing on the near side.

The housing 13 has the front surface 121 on which the rectangular display surface 111a is provided. An elongated cylindrical rotation shaft member 43 is provided on the near side of the housing 13. The housing 13 is attached to the image processing apparatus 1 so as to be rotatable about the central axis 44 of the rotation shaft member 43. By rotating the housing 13, the user can adjust the angle of the operation panel 10 such that the display surface 111a can be easily seen, for example, in accordance with the height of the user.

The display surface 111a is disposed close to the left corner 122 of the front surface 121 and on the far side as viewed from the user. The first button 21, the second button 22, the third button 23, and the fourth button 24 are provided to be disposed side by side on the near side of the display surface 111a from the left side. The fifth button 25, the sixth button 26, and the seventh button 27 are provided side by side on the right side of the display surface 111a from the near side. As described above, the front surface 121 of the housing 13 is provided with the operation unit (the display surface 111a and the buttons) used for the operation of the image processing apparatus 1. Surface 121 is an example of the "operation surface" of the present disclosure.

A recessed portion 135 is provided around the fifth button 25. The recessed portion 135 is a portion recessed from the front surface 121. In other words, the recessed portion 135 is a portion in which the front surface 121 is recessed toward the inner side of the housing 13. Similar recessed portions 136 and 137 are provided around the sixth button 26 and the seventh button 27, respectively. On the other hand, a recessed portion is not provided around the first button 21 to the fourth button 24.

In the third exemplary embodiment, the button not provided with the recessed portion is referred to as the "first operation button", and the button provided with the recessed portion is referred to as the "second operation button". The first operation button is an example of the "first operation unit" of the present disclosure, and the second operation button is an example of the "second operation unit" of the present disclosure. The difference in structure between the first operation button and the second operation button will be described with reference to FIGS. 30A to 32B.

Figure 30A:
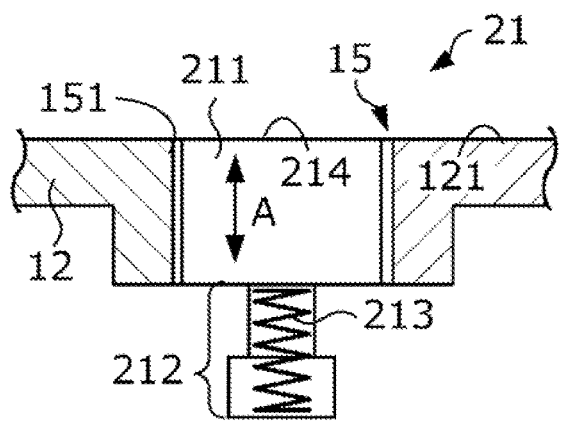
FIGS. 30A and 30B are diagrams illustrating a first button.
Figure 30B:
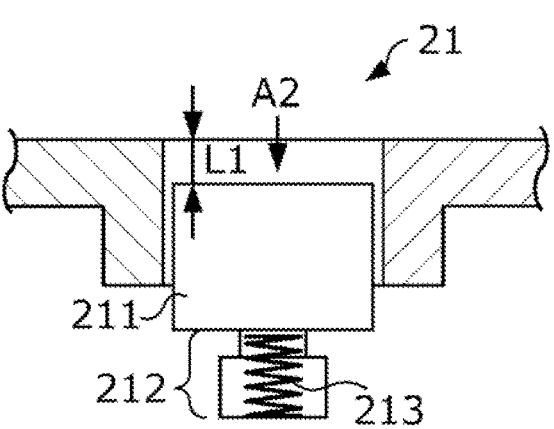

FIGS. 30A and 30B illustrate a cross section of the first button 21. The first button 21, which is one of the first operation buttons, includes the contact portion 211, the expansion and contraction portion 212, and the spring 213. The contact portion 211 is, for example, a rectangular parallelepiped-shaped member, and a finger of a user who operates the first button 21 comes into contact with the rectangular contact surface 214. The contact portion 211 is disposed in the hole 15 of the housing 13, and moves in a direction along the inner circumferential surface 151 of the hole 15 (in the penetration direction A representing the direction in which the hole 15 penetrates the housing 13).

The expansion and contraction portion 212 is fixed to a side of the contact portion 211 opposite to the contact surface 214. The expansion and contraction portion 212 is a member extending and contracting in the penetration direction A and is provided with the spring 213 therein. In the third exemplary embodiment, as illustrated in FIG. 30A, the first button 21 is provided such that the levels (the positions in the penetration direction A) of the contact surface 214 and the front surface 121 of the housing 13 are substantially the same when no force is applied to the contact surface 214. Here, the level is from the front surface 121 as a reference.

The larger protrusion from the front surface 121 means the higher level, while the larger recess from the front surface 121 means the lower level.

When the user performs an operation of pushing the contact surface 214 and moves the contact portion 211 in the pushing-in direction A2 by the pushing-in amount L1, the expansion and contraction portion 212 fixed to the contact portion 211 is contracted as illustrated in FIG. 30B. As a result, for example, an open and close state of a circuit (not illustrated) is switched, and an operation associated with the first button 21 (for example, an operation of starting a copy function) is performed in conjunction therewith. When the user releases the finger from the contact surface 214, the spring 213 pushes back the contact portion 211 to return to the state illustrated in FIG. 30A.

Figure 31:
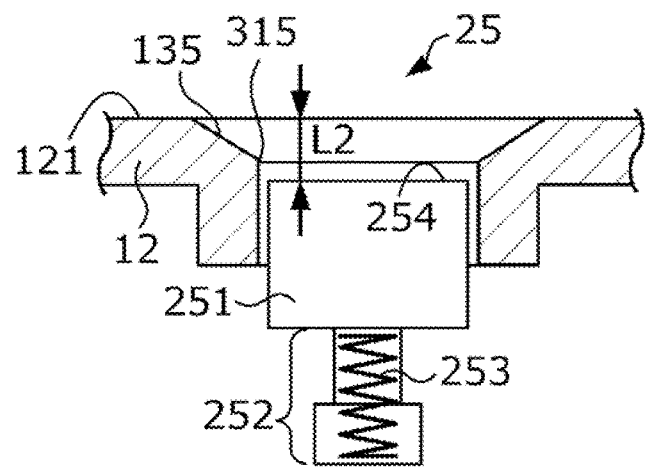
FIG. 31 is a diagram illustrating a fifth button.

FIG. 31 illustrates a cross section of the fifth button 25. The fifth button 25, which is one of the second operation buttons, includes a contact portion 251, an expansion and contraction portion 252, and a spring 253, which are the same in shape, size and material as the contact portion 211, the expansion and contraction portion 212, and the spring 213 of the first button 21, respectively (accordingly, the spring coefficient is the same). The fifth button 25 is different from the first button 21 in the disposition and the shape around the button.

The recessed portion 135 illustrated in FIG. 29 is provided around the fifth button 25. That is, in the housing 13, a portion surrounding the fifth button 25 (that is, the recessed portion 135) is recessed from the front surface 121. The fifth button 25 is provided such that a contact surface 254 is located lower than a lower end 315 of the recessed portion 135 when no force is applied to the contact surface 254. That is, the recessed portion 135 is recessed than the front surface 121, and the fifth button 25 is further recessed than the recessed portion 135.

The distance between the contact surface 254 and the front surface 121 is defined as a distance L2. In the first button 21, the distance between the contact surface 214 of the first button 21 and the front surface 121 is approximately 0, and in the fifth button 25, the contact surface (a surface pushed by the user) is recessed by a distance L2 as compared with the first button 21. Since the springs of the fifth button 25 and the first button 21 are the same, the pushing-in amount until the operation is received after the contact surface is touched does not change.

However, the fifth button 25 has a recessed contact surface and thus is less easy to push and receives the operation less easily than the first button 21. Contrarily, the first button 21 has a contact surface located higher and thus is easier to push and receives the operation more easily than the fifth button 25.

Figures 32A, 32B:
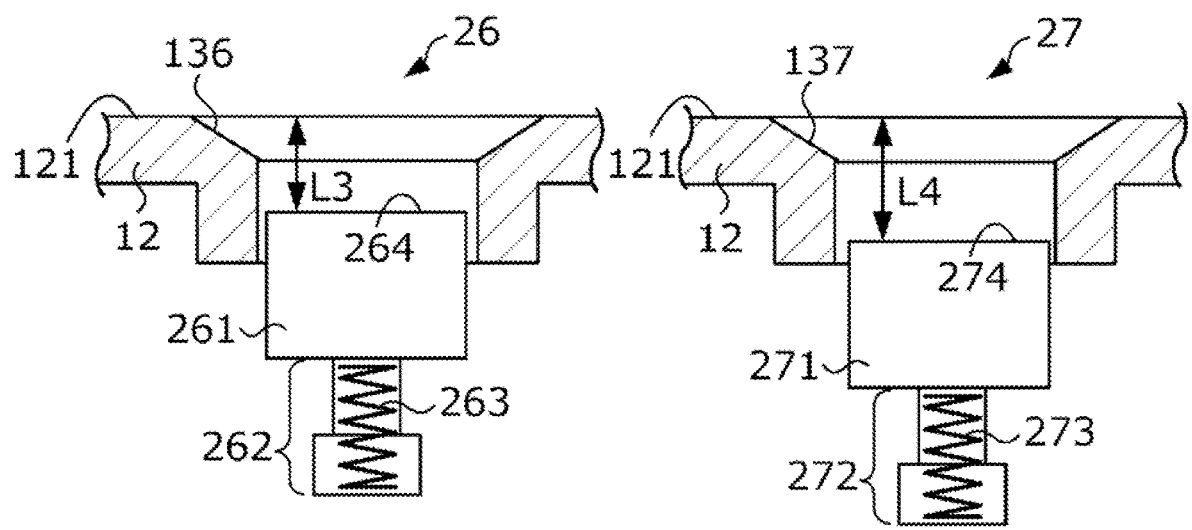
FIGS. 32A and 32B are diagrams illustrating a cross section of a sixth button and a cross section of a seventh button.

FIGS. 32A and 32B illustrate a cross section of the sixth button 26 and a cross section of the seventh button 27. FIG. 32A illustrates a contact portion 261, an expansion and contraction portion 262, and a spring 263 of the sixth button 26. FIG. 32B illustrates a contact portion 271, an expansion and contraction portion 272, and a spring 273 of the seventh button 27. Similar to the fifth button 25, the expansion and contraction portion and the spring have the same shape, size, and material as the first button 21.

The recessed portion 136 illustrated in FIG. 29 is provided around the sixth button 26, and the recessed portion 137 illustrated in FIG. 29 is provided around the seventh button 27. That is, in both the sixth button 26 and the seventh button 27, similar to the fifth button 25, a portion surrounding the button (that is, the recessed portion) is recessed from the front surface 121 of the housing 13. Both the sixth button 26 and the seventh button 27 are further recessed than the respective recessed portions.

Therefore, the second operation button receives an operation less easily than the first operation button. This difference is caused by the shape of the second operation button including the portion (recessed portion) surrounding the operation unit. That is, the second operation button is so shaped as to receive an operation less easily than the first operation button. The distance between the contact surface 264 of the sixth button 26 and the front surface 121 is defined as a distance L3, and the distance between the contact surface 274 of the seventh button 27 and the front surface 121 is defined as a distance L4.

When the distances from the front surface 121 of the second operation button are compared, the distance L4>the distance L3>the distance L2 is satisfied. That is, in comparison between the second operation buttons, the seventh button 27 least easily receives the operation, and the sixth button 26 receives the operation next least easily. Among the second operation buttons, the fifth button 25 is most easy to receive the operation. The disposition of the first operation button and the second operation button on the front surface 121 will be described with reference to FIG. 33.

Figure 33:
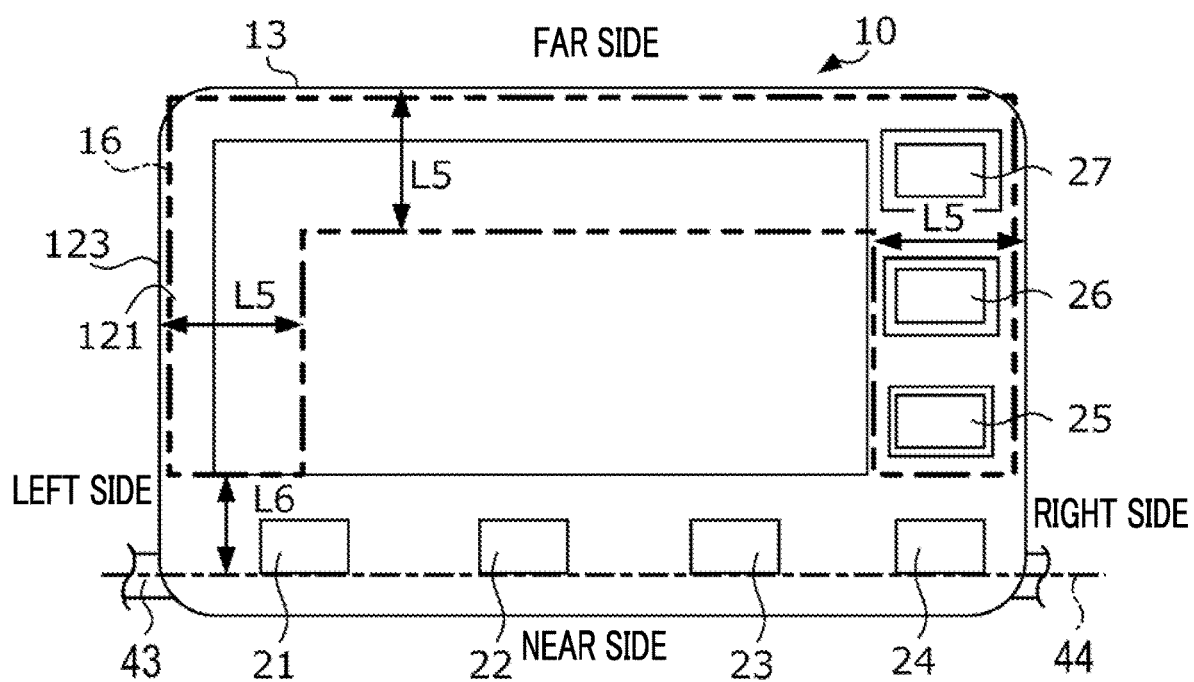
FIG. 33 is a diagram illustrating the disposition of buttons.

FIG. 33 is a diagram for describing the disposition of the buttons. When the operation panel 10 is rotated, the user tends to hold an end, which is easier to hold. In addition, since a large force is required to rotate the rotating shaft when the user holds a portion close to rotation axis (the central axis 44 of the rotation shaft member 43), it is easier for the user to hold a portion at a position away from the rotating axis as much as possible. In FIG. 33, in consideration of the ease of holding, a region with which the user's hand is highly likely to come into contact when the user rotates the operation panel 10 is defined as a contact region 16.

In the third exemplary embodiment, a region of a defined distance L5 from an outer edge 123 of the front surface 121, which excludes a range with a defined distance L6 from the rotation axis of the operation panel 10 (the central axis 44 of the rotation shaft member 43) is defined as the contact region 16. The distance L5 is determined, for example, by experimentally measuring a distance from an end with which a general user (which may be a user with a larger hand than a general user) may come into contact with when the user holds the end of the operation panel 10.

The distance L6 is determined, for example, by experimentally measuring the distance between the rotation axis and a portion where the hand of a general user (which may be a user who is more stronger than the general user) comes into contact with the front surface 121 when the user holds a portion at a position so close to the rotation axis as to make it difficult for the user to rotate the operation panel 10. The first operation button such as the first button 21 is provided outside the contact region 16, and the second operation button such as the fifth button 25 is provided within the contact region 16.

As described above, the first operation button is configured to receive the operation more easily than the second operation button. Conversely, the second operation button is configured to receive the operation less easily than the first operation button. Therefore, even when the user touches the second operation button while gripping the contact region 16 to rotate the operation panel 10, the operation is less easily received by the second operation button than by the first operation button touched by the user.

In the third exemplary embodiment, the first operation button and the second operation button are disposed as described above, so that an erroneous operation due to the gripping of the operation panel 10 is less likely to occur than when the first operation button is provided within the contact region 16. In addition, since the first operation button is provided outside the contact region 16, a more easily operable button (first operation button) can also be used with the erroneous operation being less likely to occur, as compared with the case where all buttons are used as the second operation buttons.

In the third exemplary embodiment, the three second operation buttons are disposed such that as they become more distant from the central axis 44, the operation becomes less easy to receive. When the operation panel 10 is rotated, the user is easier to hold a portion at a position as far as possible from the central axis 44 because the operation panel 10 is rotated by a small force. That is, the possibility that the user's hand comes into contact with a portion of the operation panel 10 during the rotation of the operation panel 10 increases as the distance of the portion from the central axis 44 increases, and thus, the button is configured to receive the operation less easily so that the possibility of the erroneous operation is made smaller.

On the other hand, since the possibility that the user's hand comes into contact with a portion of the operation panel 10 during the rotation of the operation panel 10 decreases as the distance of the portion from the central axis 44 decreases, the button is made easier to receive the operation and the ease of the operation of the entire operation panel 10 is improved. In the third exemplary embodiment, the second operation button is surrounded by the recessed portion. When the user's hand touches the recessed portion during the rotation of the operation panel 10, the user notices the recessed portion and thereby adjusts the force or changes the hand so as not to push the button.

In the third exemplary embodiment, the second operation button is so shaped as to receive the operation less easily than the first operation button. As a result, for example, even when a function of controlling an operation reception is not provided, an erroneous operation is prevented. Specifically, the contact surface of the second operation button is recessed from the first operation button. As a result, the second operation button does not receive an operation unless a pointed portion such as a finger tip comes into contact with the second operation button.

In the third exemplary embodiment, a recessed portion is provided around the second operation button. This makes it easier to push the recessed contact surface when the user intentionally operates the second operation button, as compared with a case where the recessed portion is not provided, that is, a case where the portion surrounding the second operation button is not recessed from the front surface 121.

Modification Example

The third exemplary embodiment described above is only an example of the present disclosure, and may be modified as follows. The third exemplary embodiment and each modification example may be implemented in combination as necessary.

Surrounding of Second Operation Button

In the third exemplary embodiment, a recess is provided around the second operation button, but the disclosure is not limited thereto.

Figure 34:
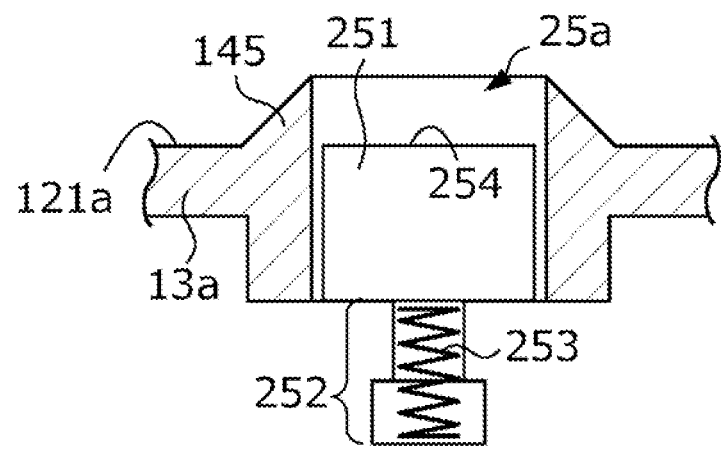
FIG. 34 is a diagram illustrating a cross section of a fifth button of a modification example.

FIG. 34 illustrates a cross section of a fifth button 25a of the modification example. The fifth button 25a includes the contact portion 251, the expansion and contraction portion 252, and the spring 253, similarly to the third exemplary embodiment. A protrusion portion 145 is provided around the fifth button 25a of a housing 13a.

The protrusion portion 145, which is a portion surrounding the fifth button 25a, protrudes from a front surface 121a of the housing 13a. That is, the level of the protrusion portion 145 is higher than that of the front surface 121a. The stimulation when the protrusion portion comes into contact with the user's hand is more likely to be greater than the recessed portion, and the user is more likely to notice the presence of the second operation button. Therefore, according to the modification example, the user becomes easier to notice the presence of the second operation button and pays attention to prevent an erroneous operation, as compared with a case where the recessed portion is provided.

In the modification example, for example, the first button 21 illustrated in FIGS. 30A and 30B is used as the first operation button. Therefore, none of the recessed portion and the protrusion portion is provided around the first operation button as in the third exemplary embodiment. That is, in the housing 13a, a portion surrounding the second operation button (the fifth button 25a or the like) is at a level higher from the front surface 121a than a portion surrounding the first operation button (the first button or the like).

As a result, in a region (outside the contact region 16) where the possibility that the user comes into contact with the operation panel during the rotation of the operation panel is low, the front surface 121 is not uneven, and the design of the front surface 121 is simplified. The level of the protrusion portion 145 from the front surface 121 is higher than that of the fifth button 25a, which is the second operation button. That is, the fifth button 25a is recessed from the protrusion portion 145.

On the other hand, in the modification example, the first operation button does not protrude or is not recessed from the front surface 121 as in the third exemplary embodiment. Therefore, also in the modification example, the fifth button 25a serving as the second operation button is configured to receive an operation less easily than the first operation button. Accordingly, an erroneous operation of when the operation panel is gripped is prevented, as in the third exemplary embodiment.

Size of Second Operation Button

In each of the above-described examples, the second operation button is recessed to receive the operation less easily, which is non-limiting.

Figure 35:
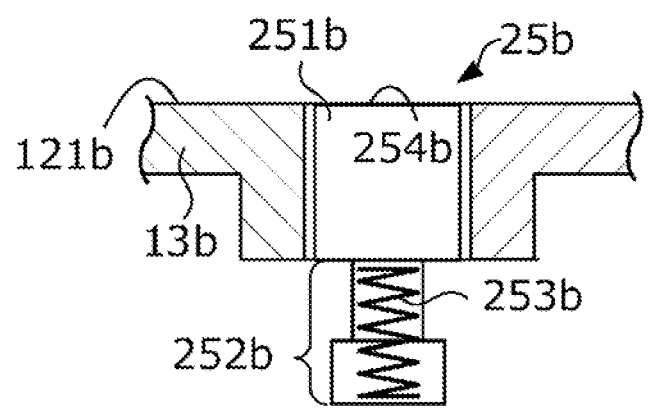
FIG. 35 is a diagram illustrating a cross section of a fifth button of a modification example.

FIG. 35 illustrates a cross section of a fifth button 25b of the modification example. The fifth button 25b includes a contact portion 251b, an expansion and contraction portion 252b, and a spring 253b.

In the modification example, for example, the first button 21 illustrated in FIGS. 30A and 30B is used as the first operation button. A contact surface 254b of the contact portion 251b is smaller in area than the contact surface 214 of the first button 21. The same applies to the contact portions of other second operation buttons (the sixth button and the seventh button). Therefore, in the modification example, the second operation button (the fifth button 25b or the like) is smaller in size (area) of the contact surface, which is a surface pushed by the user, than the first operation button (the first button 21).

Therefore, the front surface 121b around the contact surface of the second operation button is more likely to be caught by the user's hand when the hand comes into contact with the second operation button, and the operation is received less easily by the second operation button than by the first operation button. Even when a recessed portion or a protrusion portion is not provided around a button as in the fifth button 25b, and the button does not protrude or is not recessed from the front surface 121b as in the contact surface 254b, the operation is received less easily by the second operation button than by the first operation button.

As described above, in the modification example, the first operation button and the second operation button may have the same structure except for the size of the contact surface. In this case, the unevenness of the front surface 121 caused by the first operation button and the second operation button is eliminated. Incidentally, it is not necessary to completely eliminate the unevenness of the front surface 121, and the unevenness may be used in combination in the modification example. For example, a recessed portion or a protrusion portion may be provided around the second operation button of the modification example.

In addition, the second operation button of the modification example may be recessed from the front surface 121b, the recessed portion, or the protrusion portion. In either case, the downsizing of the contact surface can make the reception of the operation less easy, and thus, the degree of unevenness may be reduced. That is, in the modification example, a design in which the unevenness of the front surface of the housing is reduced as compared with a case in which the size of the contact surface of each button is made uniform may be adopted.

Grip Portion

Some operation panels have a shape that allows a user to easily hook a finger on the assumption that the user grasps the operation panel.

Figure 36A:
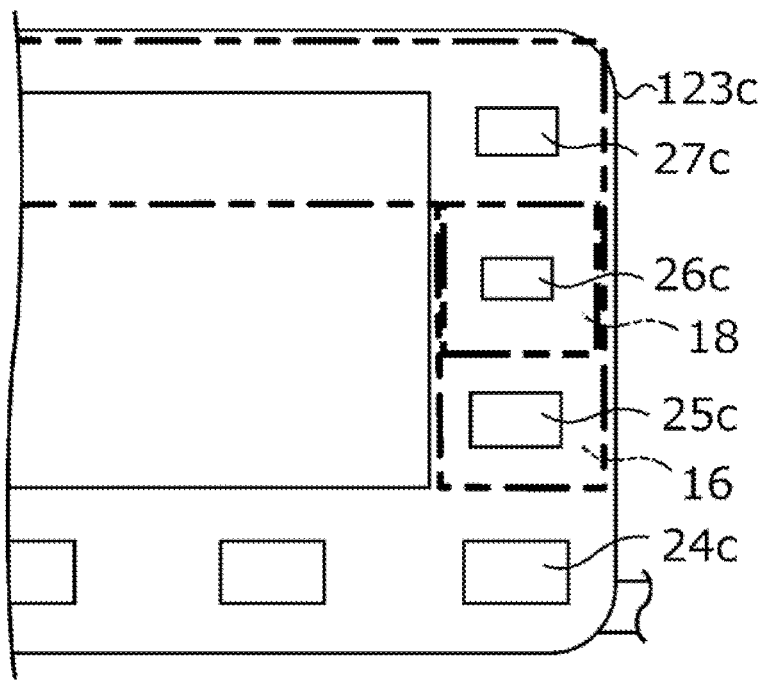
FIGS. 36A and 36B are diagrams illustrating an operation panel of a modification example.
Figure 36B:
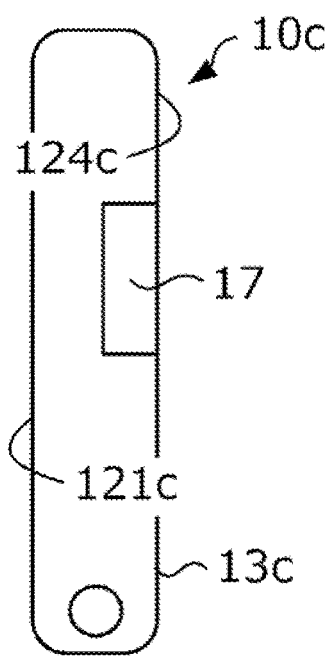

FIGS. 36A and 36B illustrate an operation panel 10c of the modification example. FIG. 36A illustrates the front surface of the operation panel 10c, and FIG. 36B illustrates the right side surface of the operation panel 10c. In the operation panel 10c, a cutout portion 17 is provided in a region on an outer edge 123c of a rear surface 124c of the front surface 121c of the housing 13c.

The cutout portion 17 is a portion obtained by clipping a portion from the rectangular parallelepiped shape of the housing 13c. It is easy for the user to grasp the portion in which the cutout portion 17 is provided because the housing 13c is thinned. As described above, the cutout portion 17 is a portion for facilitating gripping of the housing 13c, and is an example of the "grip portion" of the present disclosure. The rear surface 124c has a part provided with the cutout portion 17 and a part not provided with the cutout portion 17.

In FIG. 36A, a region in which the cutout portion 17 is provided on the rear side of the contact region 16 illustrated in FIG. 33 is illustrated as a grip region 18. In the contact region 16, a fifth button 25c, a sixth button 26c, and a seventh button 27c are provided as second operation buttons, and the sixth button 26c is provided in the grip region 18. In the modification example, the easiness of the operation reception differs depending on the size of the contact surface.

For example, the size of the contact surface of each of the three second operation buttons is smaller than that of the fourth button 24c which is the first operation button. Among the second operation buttons, the contact surface of the fifth button 25c is the largest, the contact surface of the seventh button 27c is the second largest, and the contact surface of the sixth button 26c is the smallest. That is, among the second operation buttons, one with the cutout portion 17 on the rear side (the sixth button 26c) receives the operation less easily than others without the cutout portion 17 on the rear side (the fifth button 25c and the seventh button 27c).

Since the grip region 18 has the cutout portion 17 on the rear side, the hand of the user who grasps the end of the housing 13c easily comes into contact with the grip region during the rotation of the operation panel 10c as compared with the region in which the cutout portion 17 is not provided on the rear side. In the modification example, in the operation panel provided with the grip portion such as the cutout portion 17, buttons with higher possibility of contact by the user's hand are configured to receive the operation less easily. As a result, the possibility of the erroneous operation is further reduced as compared with a case where all the second operation buttons are made common.

In the example of FIGS. 36A and 36B, the cutout portion 17 serving as the grip portion has a concave shape (concave portion), and the end of the housing 13c is easily gripped by thinning the concave-shaped portion. In the modification example, the disclosure is not limited thereto, and for example, the grip portion may have a convex shape (protrusion). In this case, by hooking the fingers to the projecting grip portion, force can be easily applied and the housing can be easily gripped. The grip portion may also have a concavo-convex shape (both the concave portion and the protrusion).

In this case, since the user strongly grasps the thinned concave portion while hooking the fingers on the protrusion portion, the housing can be more easily gripped. Further, the grip portion is not limited to having a concavo-convex shape. For example, a handle (U-shaped or L-shaped) may be provided on the rear side of the outer edge. Also in this case, fingers are hooked on the handle, so that the housing can be easily gripped. Further, a non-slip rubber may be adhered to the rear side of the outer edge. In this case, since the fingertip is less likely to slip, the housing can be easily gripped.

In the modification example, the first operation button and the second operation button may be provided based only on the positional relationship with the grip portion regardless of the contact region. In this case, the first operation button is provided on a front side of a region where the cutout portion 17 as the grip portion is not provided on the rear surface (for example, the rear surface 124c), and receives the user's operation. The second operation button is provided on the front side of a region where the cutout portion 17 as the grip portion is provided on the rear surface, and receives the user's operation.

The second operation button is configured to receive the operation less easily than the first operation button. Also in this case, the hand of the user who grasps the end of the housing easily comes into contact with the second operation button during the rotation of the operation panel as compared with the first operation button in which the cutout portion 17 is not provided on the rear side. Therefore, the possibility of the erroneous operation is reduced as compared with a case where the first operation button and the second operation button are disposed regardless of whether or not the cutout portion 17 is provided on the rear side.

Shape of Surface

The front surface (operation surface) of the operation panel has a square shape (rounded corner) in the third exemplary embodiment, but is not limited to this shape, and may have other shapes (a circular shape, an elliptical shape, other polygonal shapes, or the like).

Corners and Sides

When the front surface (operation surface) of the operation panel has a polygonal shape having sides and corners, the second operation button may be disposed as follows.

Figure 37:
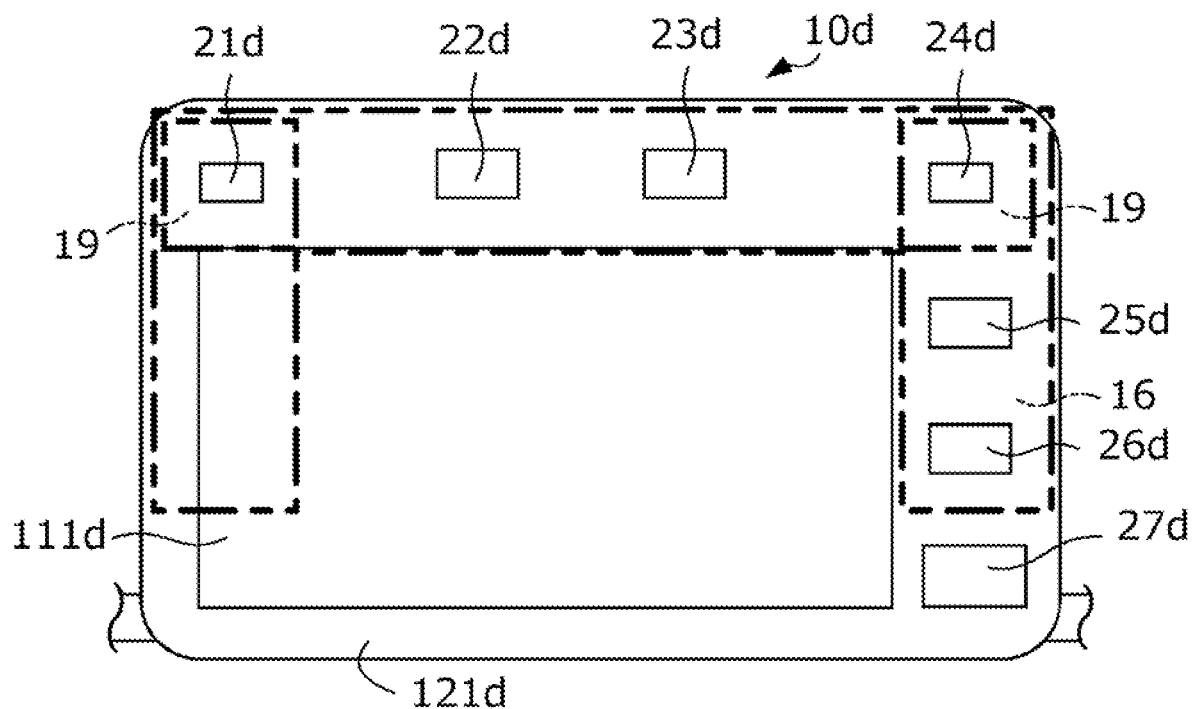
FIG. 37 is a diagram illustrating an operation panel of a modification example.

FIG. 37 illustrates an operation panel 10d of the modification example. In the operation panel 10d, a display surface 111d is provided at a position close to the left side and the near side of a front surface 121d. A first button 21d, a second button 22d, a third button 23d, and a fourth button 24d are provided on the far side of the display surface 111d from the left side.

A fifth button 25d, a sixth button 26d, and a seventh button 27d are provided on the right side of the display surface 111d. The six buttons from the first button 21d to the sixth button 26d are the second operation buttons provided within a contact region 16d. Thus, the six buttons have a contact surface smaller than that of the seventh button 27d as the first operation button provided outside the contact region 16d, and are configured to receive the operation less easily.

FIG. 37 illustrates a corner region 19, which is located at the corner of the front surface 121d, of the contact region 16d. In the corner region 19, the first button 21d and the fourth button 24d are provided, and these buttons have a smaller contact surface than the other second operation buttons. That is, in the modification example, among the second operation buttons, one located at the corner of the front surface 121d is configured to receive the operation less easily than another located at the side of the front surface 121d.

When the operation panel is rotated, the corner portion is easier to be gripped than the side portion. In the modification example, the second operation button in such a region more likely to be gripped is configured to receive the operation less easily, so that the possibility of the erroneous operation is made lower than when all second operation units are made common in the operation panel having the operation surface with corners (the operation surface 121d in the modification example).

First Operation Button

The first operation button is not limited to that illustrated in FIGS. 30A and 30B. For example, in the example of FIGS. 30A and 30B, the level of the contact surface is substantially the same as that of the front surface 121 of the housing 13, but the contact surface may protrude or may be recessed from the front surface 121. In addition, a recessed portion or a protrusion portion may be provided around the first operation button. It suffices that it is easier for all the first operation buttons to receive an operation than it is for the second operation button, for example, the first operation button is not recessed as much as the second operation button, and the recessed portion is shallower or the protrusion portion is lower than the second operation button.

Operation Unit

The operation unit that receives the user's operation is not limited to the button having a rectangular contact surface described in the third exemplary embodiment. For example, the button may have another shape such as a circular shape or an elliptical shape. Instead of a button, a toggle switch, a rocker switch (tumbler switch), a slide switch, a rotary switch, or the like may be used. In such an operation unit, it suffices that the pushability of the first operation unit and the pushability of the second operation unit are different from each other by making the magnitude of the force, the movement amount, or both the magnitude of the force and the movement amount at the time of moving a movable portion of the switch different as in the modification example.

Operation Device

The device operated by the operation panel (operation device) is not limited to the image processing apparatus described in the third exemplary embodiment. The operation device may be, for example, an image processing apparatus having only an image forming function or an image processing apparatus having only an image reading function. The operation device may be a device that performs other processing (for example, communication processing, calculation processing, and display processing) instead of image processing. In short, the operation device may be any device as long as the operation device includes a main unit whose operation is instructed by an operation on the operation panel.

Operation Panel

Further, the operation panel of the third exemplary embodiment is attached to the device main body so as to be rotatable about the rotation axis, but the disclosure is not limited to this, and may be detachable from the apparatus main body, for example. In addition, a remote controller that is not attached to the apparatus main body and receives an operation may be used.

Even in these cases, when the operation panel has a plate shape similar to the operation panel 10 of the third exemplary embodiment, the user may unintentionally push the button because the user holds the end of the operation panel when carrying the operation panel. As in the third exemplary embodiment, therefore, the possibility of the erroneous operation can be reduced by defining the contact region as a region with a defined distance from the outer edge of the front surface on which the operation unit is provided, providing the first operation button outside the contact region, and providing, within the contact region, the second operation button which receives the operation less easily than the first operation button.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An operation panel comprising:
   a housing;
   a reading unit configured to read information from a medium allowed to approach a predetermined position of the housing;
   a first operation unit provided outside a predetermined range including the position in a front surface of the housing and configured to receive an operation; and
   a second operation unit provided within the range, configured to receive an operation, and configured to receive the operation less easily than the first operation unit.

2. The operation panel according to claim 1, wherein
   the first operation unit and the second operation unit receive an operation by being moved by a user, and
   kinetic energy required when the second operation unit is moved to receive the operation is larger than kinetic energy required when the first operation unit is moved to receive the operation.

3. The operation panel according to claim 2, wherein repulsion force of the second operation unit being moved is larger than repulsion force of the first operation unit being moved.

4. The operation panel according to claim 2, wherein until reception of the operation, the second operation unit moves in an amount larger than that for the first operation unit.

5. The operation panel according to claim 1, wherein
   a portion of the operation panel on a near side for the user is defined, and
   the range is defined on a far side of the operation panel from the position.

6. The operation panel according to claim 1, wherein the second operation unit does not receive any operation to the second operation unit for a determined period after the reading unit performs reading.

7. The operation panel according to claim 1, wherein
   the first operation unit and the second operation unit each include an undulation provided around the first operation unit or the second operation unit, and
   the undulation around the second operation unit is smaller in level difference than the undulation around the first operation unit.

8. An operation panel comprising:
   a housing;
   a reading unit configured to read information from a medium allowed to approach a predetermined position of the housing; and
   an operation unit configured to receive an operation and configured not to receive any operation for a predetermined period after the reading unit reads the information.

9. An operation panel comprising:
   an operation surface;
   a touch panel configured to receive an operation of moving a position indicated by an indicator on the operation surface;
   a housing having a front surface on which the operation surface is provided;
   a first operation unit provided within a region around the operation surface and configured to receive a user's operation, the region being present on extension in a direction in which the position is moved by the operation; and
   a second operation unit provided outside the region on the front surface, configured to receive a user's operation, and configured to receive the operation more easily than the first operation unit when the indicator moving on the operation surface comes into contact with the operation unit.

10. The operation panel according to claim 9, wherein a portion of the housing around the first operation unit is higher at least on an operation surface side than the first operation unit.

11. The operation panel according to claim 10, wherein the portion around the first operation unit is at a level equal to or lower than the front surface.

12. The operation panel according to claim 10, wherein at least the operation surface side of the portion around the first operation unit is higher than the front surface.

13. The operation panel according to claim 9, wherein
   the first operation unit and the second operation unit are buttons that are moved in a pushing direction to receive the operation when the buttons are pushed by a user; and
   when pushed by a user applying a force, a surface of the first operation unit moves in the pushing direction in a range narrower than that for the second operation unit.

14. An operation device comprising:
the operation panel according to claim 9; and
a main unit whose operation is instructed by an operation to the operation panel.

15. An operation panel comprising:
an operation surface;
a touch panel configured to receive an operation of moving a position indicated by an indicator on the operation surface;
an operation unit configured to receive a user's operation and to control whether or not to receive the operation; and
a control unit configured to perform control such that the operation unit does not receive any operation when the position is moved to an end of the operation surface and thus not detected, wherein
the control unit is further configured to perform control such that the operation unit does not receive any operation when disposed on an extension in the direction in which the position is moved.

16. An operation panel comprising:
a plate-shaped housing having an operation surface provided with an operation unit for use in an operation of a device;
a first operation unit provided outside a region with a predetermined distance from an outer edge of the operation surface and configured to receive a user's operation; and
a second operation unit provided within the region, configured to receive a user's operation, and configured to receive the operation less easily than the first operation unit.

17. The operation panel according to claim 16, wherein
the housing is attached to a device to be operated so as to rotate about a rotation axis, and
the region excludes a range with a predetermined distance from the rotation axis.

18. The operation panel according to claim 17, wherein reception of an operation of the second operation unit becomes less easy as the second operation unit becomes more distant from the rotation axis.

19. The operation panel according to claim 16, wherein
an outer edge-side region of a rear side of the operation surface of the housing has a portion where a grip portion for facilitating gripping of the housing is provided and a portion where no grip portion is provided, and
the second operation unit provided with the grip portion on a rear side receives the operation less easily than the second operation unit provided with no grip portion on the rear side.

20. The operation panel according to claim 19, wherein the grip portion has a concave shape, a convex shape, or a concavo-convex shape.

21. The operation panel according to claim 16, wherein
the operation surface has a polygonal shape having sides and corners, and
the second operation unit disposed at the corner of the operation surface receives the operation less easily than the second operation unit disposed on the side of the operation surface.

22. An operation device comprising:
the operation panel according to claim 16; and
a main unit whose operation is instructed by an operation to the operation panel.

23. An operation panel comprising:
a plate-shaped housing having an operation surface provided with an operation unit that operates a device and in which an outer edge-side region of a rear side of the operation surface has a portion where a grip portion for facilitating gripping of the housing is provided and a portion where no grip portion is provided;
a first operation unit provided on a front side of the region where no grip portion is provided on the rear surface, and configured to receive a user's operation; and
a second operation unit provided on a front side of the region where the grip portion is provided on the rear surface, configured to receive a user's operation, and configured to receive the operation less easily than the first operation unit.

* * * * *